US011475603B2

(12) United States Patent
Graziosi

(10) Patent No.: US 11,475,603 B2
(45) Date of Patent: Oct. 18, 2022

(54) MULTIPLE MESH ENCODING USING MOTION TRACKING DATA OF OBJECTS

(71) Applicant: SONY CORPORATION, Tokyo (JP)

(72) Inventor: Danillo Graziosi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 16/196,619

(22) Filed: Nov. 20, 2018

(65) Prior Publication Data
US 2019/0236809 A1 Aug. 1, 2019

Related U.S. Application Data

(60) Provisional application No. 62/622,429, filed on Jan. 26, 2018.

(51) Int. Cl.
| | |
|---|---|
| *G06T 9/00* | (2006.01) |
| *G06T 7/20* | (2017.01) |
| *G06T 17/20* | (2006.01) |
| *G06T 7/10* | (2017.01) |
| *A63B 24/00* | (2006.01) |

(52) U.S. Cl.
CPC ............ *G06T 9/001* (2013.01); *G06T 7/10* (2017.01); *G06T 7/20* (2013.01); *G06T 17/205* (2013.01); *A63B 2024/0025* (2013.01); *G06T 2207/10016* (2013.01); *G06T 2207/20021* (2013.01)

(58) Field of Classification Search
CPC .. G06T 9/001; G06T 7/10; G06T 7/20; G06T 7/215; G06T 17/20; G06T 17/205; G06T 2207/10016; G06T 2207/10028; G06T 2207/20021
See application file for complete search history.

(56) References Cited

U.S. PATENT DOCUMENTS

| | | | | |
|---|---|---|---|---|
| 6,141,041 A | * | 10/2000 | Carlbom | A63B 24/0003 348/157 |
| 6,438,266 B1 | * | 8/2002 | Bajaj | G06T 9/001 382/154 |

(Continued)

OTHER PUBLICATIONS

Kilner et al., "3D Action Matching with Key-Pose Detection"), Sep. 2009, IEEE, 2009 IEEE 12th Int. Conf. on Computer Vision Workshops, p. 1-8. (Year: 2009).*

(Continued)

*Primary Examiner* — Vincent Rudolph
*Assistant Examiner* — Timothy Choi
(74) *Attorney, Agent, or Firm* — Chip Law Group

(57) ABSTRACT

An apparatus and method for three-dimensional (3D) geometric data compression, includes storage of a first 3D geometric mesh of a first data size, which includes a 3D representation of a plurality of objects in a 3D space. The apparatus includes circuitry that receives motion tracking data of the plurality of objects from a plurality of position trackers. The motion tracking data includes motion information of each of the plurality of objects from a first position to a second position in the 3D space. The 3D geometric mesh is segmented into a plurality of 3D geometric meshes corresponding to the plurality of objects, based on the motion tracking data. As a result of the segmentation of the 3D geometric mesh before encoding and the use of motion tracking data, the plurality of 3D geometric meshes are efficiently encoded.

20 Claims, 12 Drawing Sheets

(56) References Cited

U.S. PATENT DOCUMENTS

| | | | |
|---|---|---|---|
| 9,147,288 B1* | 9/2015 | Johnston | G06T 19/00 |
| 9,648,346 B2 | 5/2017 | Zhang et al. | |
| 2007/0242083 A1* | 10/2007 | Kataoka | G06V 20/653 345/623 |
| 2016/0205341 A1* | 7/2016 | Hollander | H04N 7/015 375/240.08 |
| 2017/0132791 A1* | 5/2017 | Li | G06T 19/20 |
| 2017/0347120 A1 | 11/2017 | Chou et al. | |
| 2019/0051036 A1* | 2/2019 | Matsunobu | G06T 7/55 |

OTHER PUBLICATIONS

Wachter et al., "Hierarchical Segmentation of Manipulation Actions based on Object Relations and Motion Characteristics", Jul. 2015, IEEE, 2015 Int. Conf. on Advanced Robotics, p. 1-8. (Year: 2015).*

Smolic, "3D video and free viewpoint video—From capture to display", Sep. 2011, Elsevier, Pattern Recognition, vol. 44, No. 9, p. 1958-1968. (Year: 2011).*

Gupta et al., "Registration and Partitioning-Based Compression of 3-D Dynamic Data", Nov. 2003, IEEE, IEEE Trans. on Circuits and Systems for Video technology, vol. 13, No. 11, p. 1144-1155. (Year: 2003).*

Manafifard et al., "Multi-player detection in soccer broadcast videos using a blob-guided particle swarm optimization method", May 28, 2016, Springer, Multimedia tools and Applications, vol. 76, p. 12251-122280. (Year: 2016).*

Bergamasco et al., "A graph-based technique for semi-supervised segmentation of 3D surfaces", 2012, Elsevier, Pattern Recognition Letters, vol. 33, p. 2057-2064. (Year: 2012).*

Schmidt et al., "3D Scene Segmentation and Object Tracking in Multiocular Image Sequences", Dec. 2007, Applied Computer Science Group, The 5th International Conference on Computer Vision Systems, p. 1-10 (Year: 2007).*

Knopp et al., "Scene cut: Class-specific object detection and segmentation in 3D scenes", May 2011, IEEE, 2011 International Conference on 3D Imaging, Modeling, Processing, Visualization and Transmission, p. 180-187 (Year: 2011).*

Shishir Subramanyam, "Inter Frame Compression of 3D Dynamic Point Clouds", Mathematical Problems in Engineering, vol. 2014, Article ID 423761, Oct. 27, 2017, 68 pages.

Queiroz, et al., "Motion-Compensated Compression of Point Cloud Video", Feb. 7, 2018.

Chou, et al., "Dynamic Polygon Clouds: Representation and Compression for VR/AR", Jan. 4, 2017.

* cited by examiner

MULTIPLE MESH ENCODING USING MOTION TRACKING DATA OF OBJECTS

CROSS-REFERENCE TO RELATED APPLICATIONS/INCORPORATION BY REFERENCE

This application claims priority to U.S. Provisional Patent Application Ser. No. 62/622,429 filed on Jan. 26, 2018, the entire content of which is hereby incorporated herein by reference.

FIELD

Various embodiments of the disclosure relate to encoding of three-dimensional (3D) models. More specifically, various embodiments of the disclosure relate to multiple mesh encoding using motion tracking data of objects.

BACKGROUND

Advancements in the field of three-dimensional (3D) modeling technologies have provided the ability to create 3D geometric models of objects. A 3D geometric model is a static 3D geometric mesh that resembles the shape of a particular object. Typically, a 3D model is manually designed by computer graphics artists, commonly known as modelers, by use of a modeling software application that processes multiple video feeds of objects in a 3D space, where the objects are captured by a plurality of cameras from a plurality of different viewpoints.

3D geometrical content, such as 3D geometric models, are increasingly used to create free viewpoint video content. In free viewpoint video content, a synthetic viewpoint at any user-desired location in a scene may be rendered while viewing video content. In certain scenarios, multiple cameras may be used to capture an event, for example, a sport event. In conventional systems, a set of 3D geometrical models may be created for corresponding objects, for example, objects-in-motion, participating in the event, in a 3D space. The set of 3D geometrical models may be created for every frame to capture the motion of the objects in the 3D space. Further, the set of 3D geometrical models may be encoded for every frame in order to transmit the 3D geometrical content including the 3D geometrical models, as a video content package to an external device. However, transmission of the 3D geometrical content, by a conventional 3D geometrical content encoding may require substantial bandwidth for transmission. Further, compression efficiency may be also limited due to encoding of each frame or a large number of frames Further limitations and disadvantages of conventional and traditional approaches will become apparent to one of skill in the art, through comparison of described systems with some aspects of the present disclosure, as set forth in the remainder of the present application and with reference to the drawings.

SUMMARY

Multiple mesh encoding using motion tracking data of objects is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for multiple mesh encoding using motion tracking data of objects. Exemplary aspects of the disclosure may include an apparatus that may be configured to store a three-dimensional (3D) geometric mesh of a first data size. The stored 3D geometric mesh may include a 3D representation of a plurality of objects in a 3D space. The apparatus further may receive motion tracking data of each of the plurality of objects. The motion tracking data includes motion information of each of the plurality of objects in the 3D space. The apparatus may segment the 3D geometric mesh into a plurality of 3D geometric meshes corresponding to each of the plurality of objects based on the received motion tracking data. The apparatus may further encode the plurality of 3D geometric meshes based on the motion tracking data using conventional 3D object encoding techniques, after the segmentation of the 3D geometric mesh. The encoding of the plurality of 3D geometric meshes results in a compressed 3D geometric mesh that may have a second data size which is less than the first data size of the 3D geometric mesh. The disclosed apparatus further provides a solution to reduce bandwidth utilization for transmission of the 3D geometric mesh of the plurality of objects by using motion tracking data of the plurality of objects in the 3D space. Thus, the disclosed apparatus provides a cost-effective, processing-power saving, and bandwidth saving solution using at least the motion tracking data of the plurality of objects in the 3D space to compress (or encode) the full 3D geometric mesh.

Figure 1:
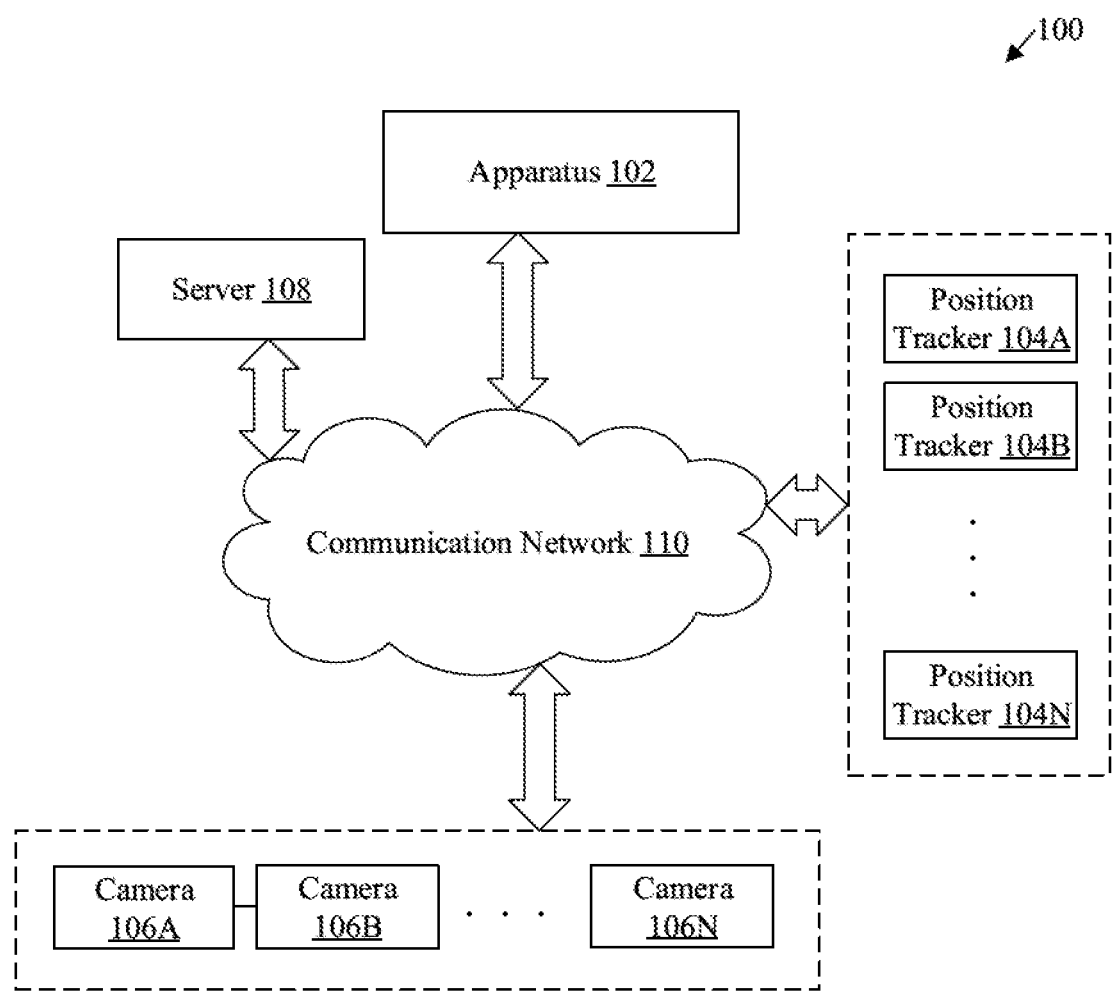
FIG. 1 is a block diagram that illustrates an exemplary network environment to encode multiple meshes using motion tracking data of objects model, in accordance with an embodiment of the disclosure.

FIG. 1 is a block diagram that illustrates an exemplary network environment for multiple mesh encoding using motion tracking data of objects, in accordance with an embodiment of the disclosure. With reference to FIG. 1, there is shown a network environment 100. The network environment 100 may include an apparatus 102, a plurality of position trackers 104A, 104B, . . . , 104N, a plurality of cameras 106A, 106B, . . . , 106N, a server 108, and a communication network 110.

The apparatus 102 may comprise suitable logic, circuitry, interfaces, and/or code that may be configured to generate a 3D geometric model (such as a 3D visual hull of a scene represented as a 3D polygon mesh or a 3D point cloud) of a scene. The 3D geometric model, hereinafter referred to as a 3D geometric mesh, may include a plurality of objects in a 3D space. Examples of the apparatus 102 may include, but are not limited to, a video broadcasting system, a computing device, a video-conferencing system, an augmented reality-based device, a gaming device, a mainframe machine, a server, a computer work-station, and/or a consumer electronic (CE) device.

The plurality of position trackers 104A, 104B, . . . , 104N may comprise suitable logic, circuitry, interfaces, and/or code that may be configured to track motion of each of the plurality of objects from a first position (e.g., start) to a second position (e.g., end) in the 3D space. Each of the plurality of position trackers 104A, 104B, . . . , 104N may be a wearable device that is worn by each of the plurality of objects (e.g., players in a sports event) in the 3D space. In some embodiments, each of the plurality of position trackers 104A, 104B, . . . , 104N may be attached to each of the plurality of objects such that the motion of each of the plurality of objects is tracked for every change in movement in the 3D space. Examples of the plurality of position trackers 104A, 104B, . . . , 104N may include, but are not limited to, a spatial location estimator, a global positioning system (GPS) tracker, a smart watch, a smartphone, or other global navigation satellite system (GNSS)-enabled devices. For example, each of the plurality of objects may be a player wearing a sportswear in which a GNSS chip may be embedded or attached to track motion of each player in the 3D space, e.g., a sport playing area.

Each of the plurality of cameras 106A, 106B, . . . , 106N may comprise suitable logic, circuitry, and/or interfaces that may be configured to capture a video of the plurality of objects in the 3D space. In accordance with an embodiment, the plurality of cameras 106A, 106B, . . . , 106N may be positioned at suitable locations in the 3D space to enable capturing a 360 degree view of the plurality of objects (e.g., players) in the 3D space. The plurality of cameras 106A, 106B, . . . , 106N may be communicatively coupled to the apparatus 102. Examples of the plurality of cameras 106A, 106B, . . . , 106N may include, but are not limited to, an image sensor, a wide-angle camera, an action camera, a closed-circuit television (CCTV) camera, a camcorder, a digital camera, a night-vision camera, a video recorder, and/or other image capturing devices.

In accordance with an embodiment, the server 108 may be configured to receive the captured video of the plurality of objects in the 3D space, from the plurality of cameras 106A, 106B, . . . , 106N. The server 108 may be further configured to generate the 3D model (such as a 3D geometric mesh that may include the plurality of objects in the 3D space), based on the captured video. The server 108 may be further configured to store the generated 3D model. Examples of the server 108 may include, but are not limited to, an application server, a cloud server, a web server, a database server, a file server, a gaming server, a mainframe server, or a combination thereof.

The communication network 110 may include a communication medium through which the apparatus 102 may be communicatively coupled to the plurality of position trackers 104A, 104B, . . . , 104N, the plurality of cameras 106A, 106B, . . . , 106N, and the server 108. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), EDGE, IEEE 802.11, Light Fidelity (Li-Fi), 802.16, IEEE 802.11s, IEEE 802.11g, multi-hop communication, wireless access point (AP), device to device communication, cellular communication protocols, and/or a combination thereof.

In operation, the plurality of cameras 106A, 106B, . . . , 106N may be configured to capture a video of plurality of objects (e.g., players in a live sports event) in the 3D space from different viewing angles. The server 108 may be configured to receive the captured video from each of the plurality of cameras 106A, 106B, . . . , 106N. The server 108 may be further configured to generate a 3D geometric mesh of a first data size based on the captured video. The 3D geometric mesh may be generated using 3D modelling techniques, known in the art. The 3D geometric mesh may include a collection of vertices, edges, and faces corresponding to the plurality of objects in the 3D space, where the collection of vertices, edges, and faces defines shapes of the plurality of objects in the 3D space. The generation of the 3D geometric mesh is described in detail, for example, in FIGS. 3A and 3B. The server 108 may be further configured to receive the motion tracking data of each of the plurality of objects in the 3D space, from each of the plurality of position trackers 104A, 104B, . . . , 104N. The motion tracking data may include position information of each of the plurality of objects in the 3D space, where the plurality of objects (e.g., the players in the live sports event) may be moving from a first position to a second position in the 3D space. The server 108 may be further configured to store the generated 3D geometric mesh and the motion tracking data. In some embodiments, the apparatus 102 may be configured to generate the 3D geometric mesh instead of the server 108, and the apparatus 102 may store the generated 3D geometric mesh. The apparatus 102 may be further configured to receive the motion tracking data of each of the plurality of objects in the 3D space, via the plurality of position trackers 104A, 104B, . . . , 104N.

The apparatus 102 may be further configured to retrieve the 3D geometric mesh and the motion tracking data from the server 108. The apparatus 102 may be configured to segment the 3D geometric mesh into a plurality of 3D geometric meshes based on the motion tracking data. Each of the plurality of 3D geometric meshes may correspond to each of the plurality of objects in the 3D space. The segmentation of the 3D geometric mesh into the plurality of 3D geometric meshes has been described in detail, for example, in FIGS. 3A and 3B.

The apparatus 102 may be further configured to encode the plurality of 3D geometric meshes based on the motion tracking data of each of the plurality of objects, after the segmentation of the 3D geometric mesh. The plurality of 3D geometric meshes may be encoded by encoding geometry (such as vertices, edges, or faces) of each of the plurality of 3D geometric meshes, based on the motion tracking data. The plurality of 3D geometric meshes may be encoded using 3D object encoding techniques, such as Moving Picture Expert Group-4 (MPEG-4) an animation framework extensions (AFX) encoding method, and the like, known in the art. The encoding operation of the plurality of 3D geometric meshes may result in a compressed 3D geometric mesh having a second data size that may require lesser bandwidth for transmission of the captured video than the bandwidth required for transmission of the captured video corresponding to the retrieved 3D geometric mesh. Thus, the apparatus 102 utilizes the motion tracking data of each of the plurality of objects in the 3D space to obtain a compressed 3D geometric mesh which results in low bandwidth and low processing power consumption in transmission of the video to one or more external devices.

Figure 2:
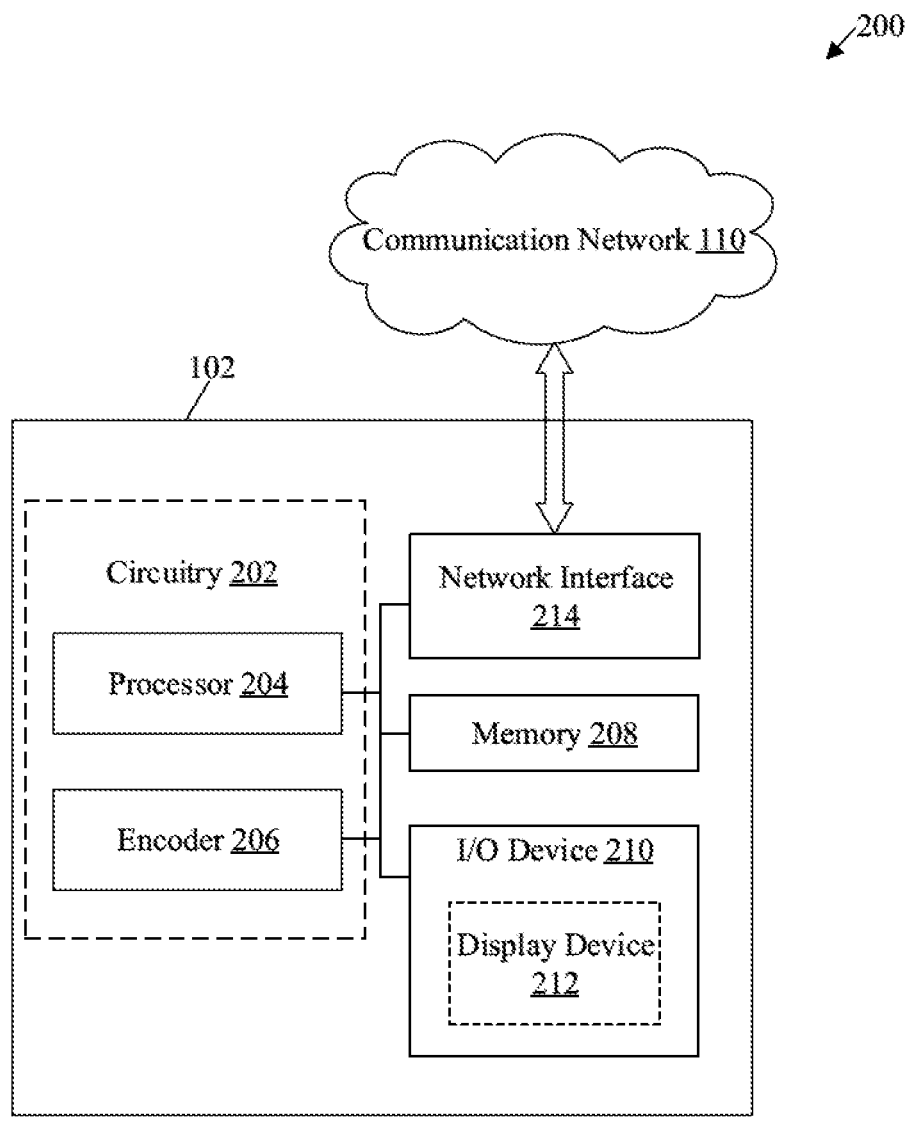
FIG. 2 is a block diagram that illustrates an exemplary apparatus for multiple-mesh encoding using motion tracking data of objects, in accordance with an embodiment of the disclosure.

FIG. 2 is a block diagram that illustrates an exemplary apparatus for multiple mesh encoding using motion tracking data of objects, in accordance with an embodiment of the disclosure. FIG. 2 is explained in conjunction with elements from FIG. 1. With reference to FIG. 2, there is shown a block diagram 200 of the apparatus 102. The apparatus 102 may include circuitry 202 which may further include a processor 204 and an encoder 206. The apparatus 102 may further include a memory 208, and an I/O device 210 that may further include a display device 212. The apparatus 102 may also include a network interface 214. The circuitry 202 may be communicatively coupled to the memory 208, the I/O device 210, and the network interface 214. The circuitry 202 may be configured to communicate with the plurality of position trackers 104A, 104B, ..., 104N, the plurality of cameras 106A, 106B, ..., 106N, and the server 108, using the network interface 214.

The processor 204 may comprise suitable logic, circuitry, and/or interfaces that may be configured to execute various operations involved in generation of the 3D geometric mesh of the plurality of objects, and segmentation of the 3D geometric mesh into a plurality of 3D geometric meshes, where each 3D geometric mesh represents one object of the plurality of objects. The processor 204 may be configured to generate the 3D geometric mesh of the plurality of objects (e.g., different players in a sport event) in a real time, near-real time, or a lag time. The processor 204 may be configured to execute the various operations involved in transmission and reception of the 3D geometric mesh. Examples of the processor 204 may be a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, other processors, and/or a combination thereof. In accordance with an embodiment, the processor 204 may be configured to control the encoder 206, the memory 208, and the input/output (I/O) device 210 to control the one or more functions of the apparatus 102.

The encoder 206 may comprise suitable logic, circuitry, and/or interfaces that may be configured to execute the various operations involved in encoding of the 3D geometric mesh of the plurality of objects. Instead of directly encoding the 3D geometric mesh of the plurality of objects, the encoder 206 may segment the plurality of 3D geometric meshes separately based on the motion tracking data. In accordance with an embodiment, the encoder 206 may be further configured to track the plurality of 3D geometric meshes based on the motion tracking data.

The memory 208 may comprise suitable logic, circuitry, and/or interfaces that may be configured to store a set of instructions executable by the circuitry 202. The memory 208 may be configured to store operating systems and associated applications. In accordance with an embodiment, the memory 208 may be further configured to store the generated 3D geometric mesh of the plurality of objects. The memory 208 may be further configured to store the motion tracking data of each of the plurality of objects in the 3D space. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, interfaces, and/or code that may be configured to receive an input from a user. The I/O device 210 may be further configured to provide an output to the user. The I/O device 210 may comprise various input and output devices, which may be configured to communicate with the circuitry 202. Examples of the input devices may include, but are not limited to, a touch screen, a keyboard, and/or a mouse. Examples of the output devices may include, but are not limited to, the display device 212.

The display device 212 may comprise suitable logic, circuitry, interfaces, and/or code that may be configured to render the 3D geometric mesh. The display device 212 may be realized through several known technologies such as, but not limited to, at least one of a Liquid Crystal Display (LCD) display, a Light Emitting Diode (LED) display, a plasma display, and/or an Organic LED (OLED) display technology, and/or other display.

The network interface 214 may comprise suitable logic, circuitry, interfaces, and/or code that may be configured to establish communication between the apparatus 102, the plurality of position trackers 104A, 104B, ..., 104N, the plurality of cameras 106A, 106B, ..., 106N, and the server 108, via the communication network 110. The network interface 214 may be implemented by use of various known technologies to support wired or wireless communication by the apparatus 102 with the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

Figure 3A:
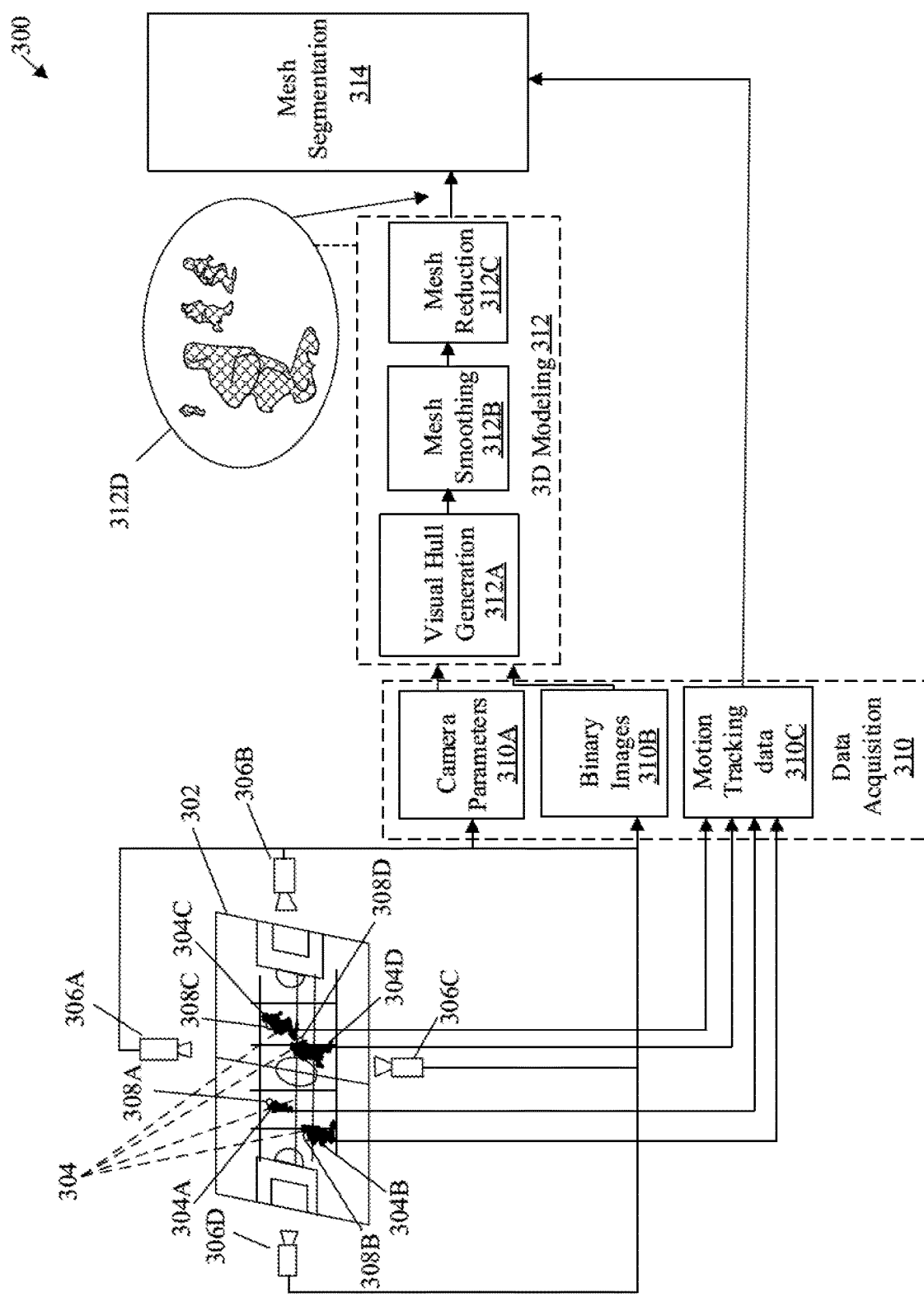
FIGS. 3A and 3B, collectively, illustrate an exemplary scenario for implementation of multiple mesh encoding using motion tracking data of objects, in accordance with an embodiment of the disclosure.
Figure 3B:
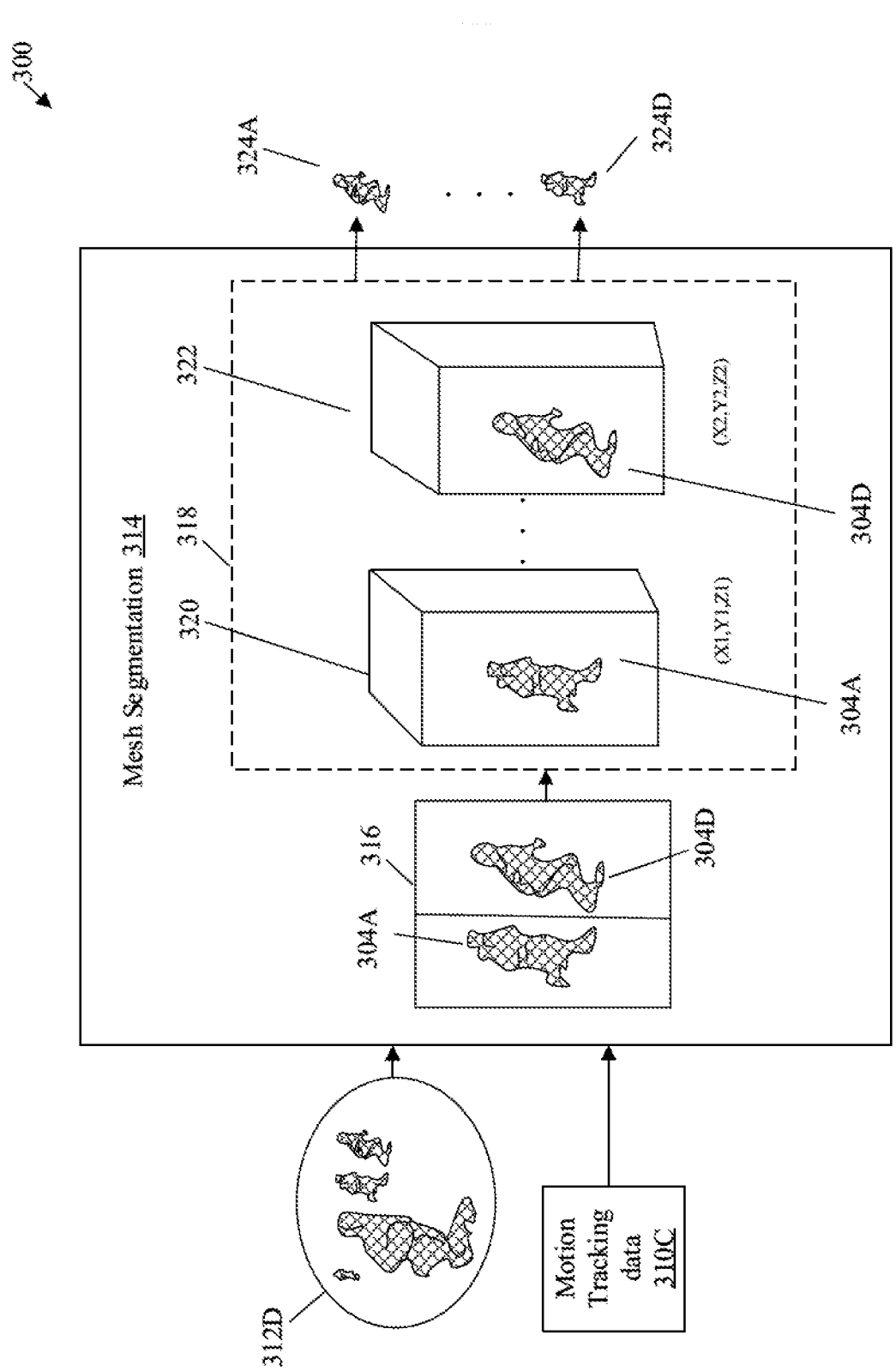

FIGS. 3A and 3B collectively, illustrates an exemplary processing pipeline for generation and segmentation of a 3D geometric mesh, in accordance with an embodiment of the disclosure. FIGS. 3A and 3B are explained in conjunction with elements from FIG. 1 and FIG. 2. With reference to FIG. 3A, there is shown a processing pipeline 300 to depict generation and segmentation of a 3D geometric mesh 312D by operations 310 to 314. There is also shown a 3D space 302 (e.g., a sport ground), a plurality of objects 304 (e.g., multiple players, such as a first object 304A, a second object 304B, a third object 304C, and a fourth object 304D), a plurality of cameras 306A to 306D, and a plurality of position trackers 308A to 308D.

The plurality of cameras 306A to 306D may correspond the plurality for cameras 106A, 106B, . . . , 106N of FIG. 1. The plurality of position trackers 308A to 308D may correspond to the plurality for cameras 104A, 104B, . . . , 104N of FIG. 1. In FIG. 3A, the plurality of objects 304 may be a plurality of players whose movement in the 3D space 302 may be tracked using the plurality of position trackers 308A to 308D. Each of the plurality of cameras 306A to 306D may be configured to capture a video of the 3D space 302 that includes the first object 304A, the second object 304B, the third object 304C, and the fourth object 304D, from different viewing angles.

At 310, the processor 204 may be configured to execute data acquisition operations. The processor 204 may be configured to acquire camera parameters 310A of each camera of the plurality of cameras 306A to 306D. The plurality of cameras 306A to 306D may be pre-calibrated for the synchronous capture of videos of the 3D space 302 from different viewing angles. The camera parameters 310A may include, but are not limited to, an identifier (ID), a position, an angle, or device setting information of each of the plurality of cameras 306A to 306D. The processor 204 may be further configured to acquire the binary images 310B from the plurality of cameras 306A to 306D. The binary images 306B may be digital images (such as silhouettes) that include only two possible values for each pixel. The plurality of binary images 306B may be obtained by subtracting background content from the plurality of images using conventional image processing techniques, such as thresholding, and the like. In some embodiments, the server 108 may be configured to process the captured video of the 3D space 302 by each of the plurality of cameras 306A to 306D to generate the binary images 310B. In some embodiments, the binary images 310B may be directly generated by the plurality of cameras 306A to 306D at the time of capture of corresponding video of the 3D space 302. The processor 204 may be further configured to acquire motion tracking data 310C of the plurality of objects 304 from the plurality of position trackers 308A to 308D.

At 312, the processor 204 may be configured to execute 3D modeling operations 312A to 312C. The 3D modeling operations 312A to 312C may be done using conventional 3D modeling techniques to generate the 3D geometric model (i.e. the 3D geometric mesh 312D) of the plurality of objects 304 in the 3D space 302. For example, at 312A, the processor 204 may be configured to generate a visual hull based on the received binary images 310B and the camera parameters 310A. The visual hull may provide a 3D representation of an object (e.g. the first object 304A). The visual hull may be an intersection generated by projecting 2D projections of the binary images from the different viewing angles of the plurality of cameras 306A to 306D.

At 3128, for mesh smoothening, the processor 204 may be configured to initially generate a 3D model as a solid 3D model from the visual hull using conventional computer graphics techniques, such as Constructive Solid Geometry (CSG) technique, and the like. The solid 3D model may be a 3D computer graphics (CG) model in which a shape of an object (such as an object from the plurality of objects 304) is represented as a combination of geometrical shapes. The processor 204 may be further configured to convert the solid 3D model into an initial 3D geometric mesh by using conventional algorithms of the CSG technique. Examples of the 3D geometric mesh may include, but are not limited to, a triangular mesh and a quadrilateral mesh. The processor 204 may then smoothen the 3D geometric mesh using conventional mesh smoothing techniques, such as Fourier transform, Laplacian smoothing, and the like. For example, in Laplacian smoothing, a new position may be assigned to each vertex of the 3D geometric mesh, to refine the 3D geometric mesh.

At 312C, the processor 204 may be further configured to reduce a size of the 3D geometric mesh using conventional mesh reduction techniques, such as vertex clustering, incremental decimation, and the like. In vertex clustering technique, the 3D geometric mesh may be reduced by joining a common vertex of the edges of the 3D geometric mesh so that the size of the 3D geometric mesh is reduced. Further, in incremental decimation technique, a vertex from the 3D geometric mesh (such as the triangular mesh) may be eliminated by selecting all triangles of the 3D geometric mesh corresponding to the vertex to be eliminated. The selected triangles may be deleted and a new plurality of triangles may be filled in place of the deleted triangles. Thus, the size of the 3D geometric mesh can be reduced using various mesh reduction techniques. The 3D geometric mesh 312D (as a first 3D geometric mesh) having a first data size may be the output of the 3D modeling operations at 312 in FIG. 3A.

In conventional 3D mesh generation and encoding techniques, the 3D geometric mesh is directly encoded without additional pre-processing. The 3D geometric mesh is encoded using conventional encoding techniques, such as MPEG-4 AFX encoding method, and the like. Accordingly, an encoded 3D geometric mesh that requires large bandwidth for transmission is obtained. In contrast to existing techniques, the processor 204 may be configured to compress data size of the 3D geometric mesh 312D having the first data size by first segmenting the 3D geometric mesh 312D into a plurality of 3D geometric meshes, as shown at 314. The operation for segmentation of the 3D geometric mesh 312D having the first data size is further described in detail in FIG. 3B.

With reference to FIG. 3B, there is shown the processing pipeline 300 in continuation to FIG. 3A to depict the segmentation of the 3D geometric mesh 312D using the motion tracking data 310C. At 314, the processor 204 may be configured to segment the 3D geometric mesh 312D based on the motion tracking data 310C (e.g. X, Y, and Z coordinates of the plurality of objects 304 in the 3D space 302). The processor 204 may segment the 3D geometric mesh 312D into the plurality of 3D geometric meshes 324A to 324D. Each of the plurality of 3D geometric meshes 324A to 324D may correspond to each of the first object 304A, the second object 304B, the third object 304C, and the fourth object 304D in the 3D space 302. The 3D geometric mesh 312D may be segmented based on one or more 3D mesh segmentation techniques, such as mean shift algorithm, Hierarchical clustering algorithm, K-means clustering, and the like. The K-means clustering may be an iterative clustering algorithm, which mainly iteratively classifies N objects based on their attributes or features into K number of clusters, where K is a positive integer (K=2, 3, 4 . . . ), the number of clusters K may be preset by a user.

For example, the processor 204 may receive a user input corresponding to a value of the K, via the display device 212. The processor 204 may be configured to compute a centroid of faces of the 3D geometric mesh 312D (e.g. centroid of triangular patches in the triangular mesh) by computing an average of the vertices of the 3D geometric mesh 312D. The processor 204 may be further configured to compute a first distance between adjacent faces of the 3D geometric mesh 312D such that segments of the 3D geometric mesh can be clustered together. The processor 204 may divide the 3D geometric mesh 312D into a plurality of clusters corresponding to each of the first object 304A, the second object 304B, the third object 304C, and the fourth object 304D. For example, a first cluster 320 corresponding to the first object 304A and a second cluster 322 corresponding to the fourth object 304D are shown in FIG. 3B. The processor 204 may further compute the first distance between the adjacent faces of the 3D geometric mesh 312D by computing a distance between the centroids of the faces of the 3D geometric mesh 312D. The processor 204 may further compute a centroid corresponding to a center of each cluster of the plurality of clusters. The processor 204 may be further configured to compute a second distance between the centroids of the plurality of clusters. The processor 204 may be configured to repeat this process based on the number of clusters K that may be preset.

The processor 204 may be further configured to compare the computed second distance with a threshold value of the second distance. The processor 204 may further cluster the adjacent faces of the 3D geometric mesh 312D into a single cluster (as segment) based on a result of the comparison of the computed second distance with the threshold value. A single cluster may correspond to one of the first object 304A, the second object 304B, the third object 304C, and the fourth object 304D in the 3D space 302. Similarly, the processor 204 may generate the plurality of clusters as the plurality of 3D geometric meshes 324A to 324D, as shown in an example, by computing centroids and the first difference between the centroids of the faces of the 3D geometric mesh 312D. The processor 204 may be further configured to separate the clusters of the 3D geometric mesh 312D based on the motion tracking data 310C corresponding to the each of the first object 304A, the second object 304B, the third object 304C, and the fourth object 304D.

In accordance with an embodiment, the processor 204 may be further configured to divide the 3D geometric mesh 312D per object in vertical manner (as shown at 316 in FIG. 3B) based on divisions of vertical edges of the 3D geometric mesh 312D, to obtain accurate mesh clusters in case the plurality of objects 304 are adjacent to each other. The processor 204 may divide the 3D geometric mesh 312D into vertical clusters (as shown at 318 in FIG. 3B) using 3D mesh segmentation techniques (such as K-means). Thus, the processor 204 may generate a plurality of 3D geometric meshes 324A to 324D from the 3D geometric mesh 312D based on geometry (such as the vertices, the edges, and the faces) of the 3D geometric mesh 312D and the motion tracking data 310C.

Figure 4:
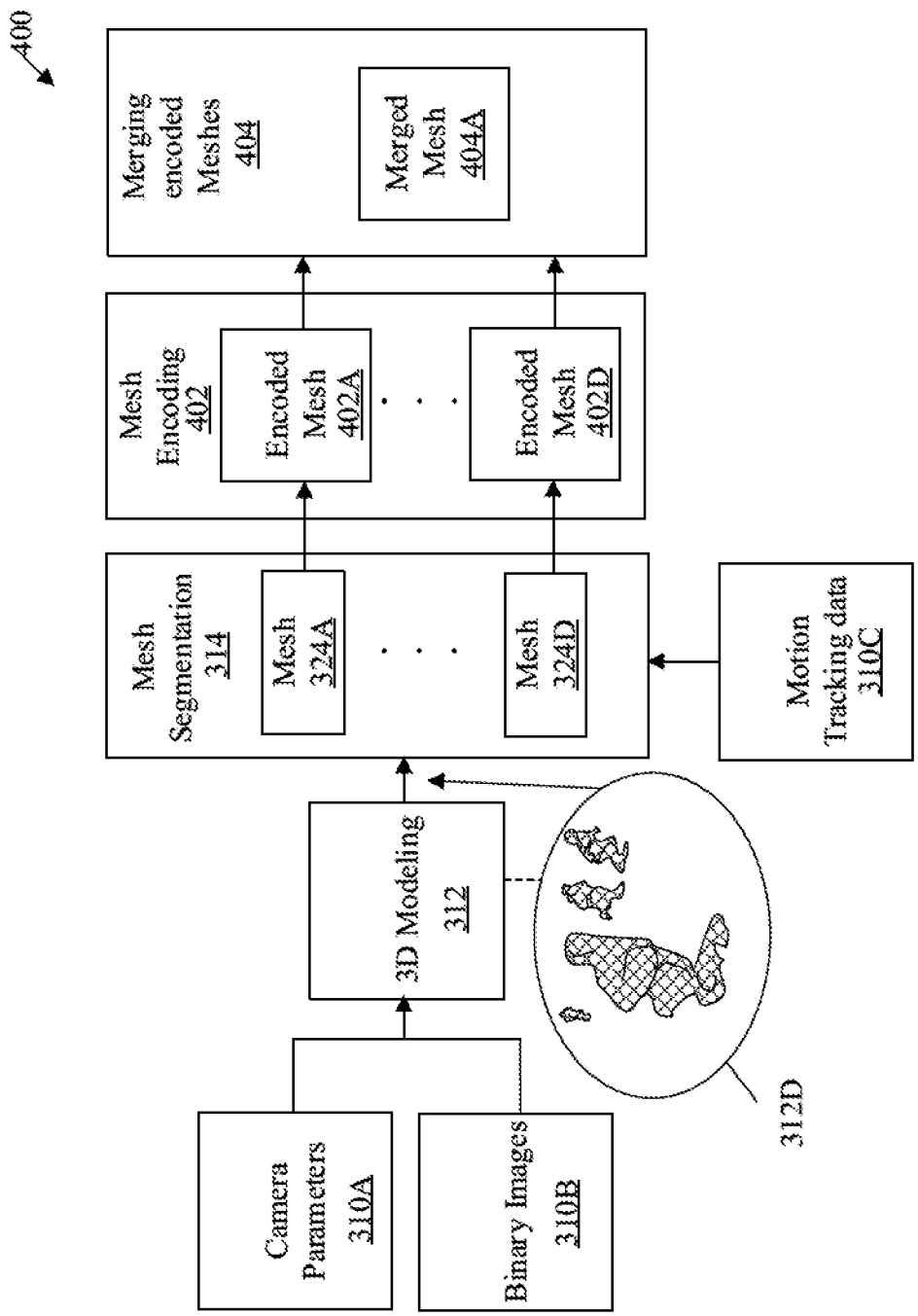
FIG. 4 illustrates a processing sequence for multiple mesh encoding that depicts distinct encoding operations of different 3D geometrical meshes before merge operation, in accordance with an embodiment of the disclosure.

FIG. 4 illustrates an exemplary processing pipeline for distinct encoding operations of different 3D geometric meshes before merge operation, in accordance with an embodiment of the disclosure. FIG. 4 is explained in conjunction with elements from FIGS. 1, 2, 3A and 3B. With reference to FIG. 4, there is shown a first processing sequence 400 for multiple-mesh encoding after segmentation of the 3D geometric mesh 312D. The operations 310, 312, and 314, such as data acquisition of camera parameters 310A and the binary images 310B, the 3D modeling, generation and segmentation of the 3D geometric mesh 312D has been described in details in the FIGS. 3A and 3B, and are applicable with respect to FIG. 4.

At 402, in the first processing sequence 400, after the segmentation of the 3D geometric mesh 312D into the plurality of 3D geometric meshes 324A to 324D, the encoder 206 may be further configured to distinctly (i.e., separately) encode each of the plurality of 3D geometric meshes 324A to 324D using the motion tracking data 310C. The encoder 206 may be configured to encode the geometry (such as vertices, edges, or faces) of the plurality of 3D geometric meshes 324A to 324D, based on the motion tracking data 310C of each of the plurality of objects 304 in the 3D space 302 to generate a plurality of encoded meshes 402A to 402D. For example, the encoder 206 may encode the vertices and the vertices connectivity of each of the plurality of 3D geometric meshes 324A to 324D, based on the motion tracking data 310C of each of the plurality of objects 304 in the 3D space 302. The encoder 206 may be configured to utilize information of the first position of each of the plurality of objects 304 as a corresponding reference frame, to separately encode each of the plurality of 3D geometric meshes 324A to 324D. The reference frame may be an image frame of the captured video that may include each of the plurality of objects 304 in the 3D space 302. The information of the first position may correspond to an initial position of each of the plurality of objects 304 in the 3D space 302. For example, the information of the first position of each of the plurality of objects 304 in the 3D space 302 may be initial position of each of a plurality of players in a sport event. The information of the first position of each of the plurality of objects 304 may be included in the motion tracking data 310C.

In accordance with an embodiment, the encoder 206 may be configured to utilize the MPEG AFX mesh compression technique to encode the plurality of 3D geometric meshes in a sequence. The encoder 206 may output the one or more bitstreams corresponding to each of the plurality of 3D geometric meshes 324A to 324D. The one or more bitstreams may include position information corresponding to each of the plurality of objects 304 in the 3D space 302, and encoding information that may comprise geometrical information (e.g. vertices, edges, or faces) and the camera parameters 310A of each of the plurality of cameras 306A to 306D. Thus, the encoder 206 may provide the one or more bitstreams corresponding to the compressed form of the plurality of 3D geometric meshes 324A to 324D, such as the plurality of encoded meshes 402A to 402D.

At 404, the encoder 206 may be further configured to merge each of the plurality of encoded meshes 402A to 402D into a single geometric mesh (i.e. merged mesh 404A) as a second 3D geometric mesh, based on the encoding information of each of the plurality of cameras 306A to 306D. Thus, a compressed 3D geometric mesh (i.e., the second 3D geometric mesh) of a second data size less than the first data size of the 3D geometric mesh 312D (i.e., the first 3D geometric mesh) may be obtained. The second 3D geometric mesh may be packaged as 3D interactive video content, e.g., for free-view or multi-view applications, which may require less bandwidth and processing power for transmission to the one or more external devices, such as in live video broadcast or live broadcast of the sports event, in comparison to existing video or 3D geometric content broadcast.

Figure 5:
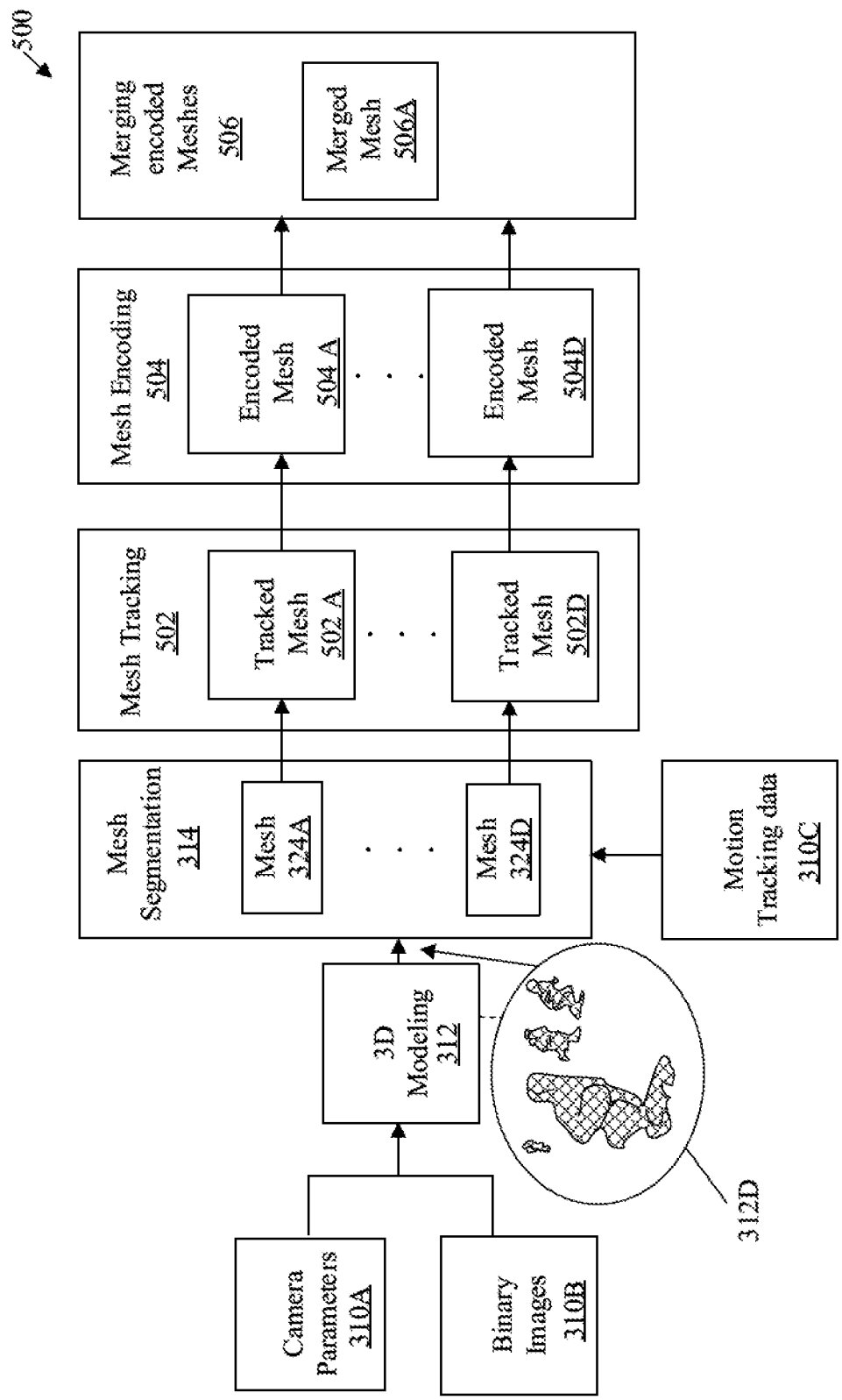
FIG. 5 illustrates a processing sequence for multiple mesh encoding that depicts distinct tracking operations of different 3D geometric meshes followed by distinct encoding operations of the tracked 3D geometric meshes before merge operation, in accordance with an embodiment of the disclosure.

FIG. 5 illustrates an exemplary processing sequence for tracking operations of different 3D geometric meshes, and encoding operations of the tracked 3D geometric meshes, in accordance with an embodiment of the disclosure. FIG. 5 is explained in conjunction with elements from FIGS. 1, 2, 3A, 3B, and 4. With reference to FIG. 5, there is shown a second processing sequence 500 for multiple-mesh encoding after segmentation of the 3D geometric mesh 312D. The operations 310, 312, 314, such as data acquisition, 3D modeling, generation and segmentation of the 3D geometric mesh 312D has been described in detail in the FIGS. 3A and 3B, and omitted here in FIG. 5 for the sake of brevity.

At 502, the encoder 206 may be further configured to track the plurality of 3D geometric meshes 324A to 324D, based on the received motion tracking data 310C of each of the plurality of objects 304 in the 3D space 302. The encoder 206 may be further configured to track the vertices and the vertices connectivity of each of the plurality of 3D geometric meshes 324A to 324D corresponding to each of the plurality of objects 304, based on the motion tracking data 310C of each of the plurality of objects 304. The plurality of 3D geometric meshes 324A to 324D may be separately tracked for every frame of the captured video. Thus, a plurality of tracked 3D geometric meshes 502A to 502D may be obtained based on mesh tracking operation 502. In accordance with an embodiment, the processor 204 may be further configured to identify each of the plurality of objects 304 in the 3D space 302, based on the motion tracking data 310C of each of the plurality of objects 304. The processor 204 may be further configured to utilize the information of the first position (as an initial point) of each of the plurality of objects 304, to identify track of the vertices of the each of the plurality of 3D geometric meshes 324A to 324D. Thus, by identifying track of corresponding vertices of each of the plurality of objects 304, the processor 204 may identify each of the plurality of objects 304 in the 3D space 302.

At 504, based on mesh tracking, the encoder 206 may be further configured to distinctly encode each of the plurality of tracked 3D geometric meshes 502A to 502D. In accordance with an embodiment, the encoder 206 may be configured to identify a set of frames of the captured video in which each of the plurality of objects 304 does not move from its respective position in the 3D space 302. The encoder 206 may be further configured to discard encoding operation for the identified set of frames (i.e., a group of frames in which one or more objects of the plurality of objects 304 do not move) of the captured video. In such cases, any one frame, e.g., a first frame of the identified set of frames may be used as a key frame for encoding. In other words, the encoder 206 may be further configure to adaptively encode only one frame (i.e., the key frame) from the identified set of frames, in place of encoding each of the identified set of frames. Thus, the encoded frame corresponding to the identified set of frames may act as key frames to decode information corresponding to the identified set of frames. The encoder 206 may be further configured to distinctly generate the plurality of encoded 3D geometric meshes (i.e. a plurality of encoded 3D geometric meshes 504A to 504D), by adaptively encoding each of the plurality of tracked 3D geometric meshes 502A to 502D based on the key frames that may be identified via the mesh tracking operation 502. Therefore, such plurality of encoded 3D geometric meshes 504A to 504D may have low data size, low bandwidth, and processing power consumption for transmission of the captured video to the one or more external devices.

At 506, the encoder 206 may be further configured to merge the encoded 3D geometric meshes 504A to 504D into a single 3D geometric mesh, such as the second 3D geometric mesh (represented as the merged mesh 506A) to transmit second 3D geometric mesh (as 3D interactive video content), based on the received motion tracking data 310C and the camera parameters 310A of each of the plurality of cameras 306A to 306D.

Figure 6:
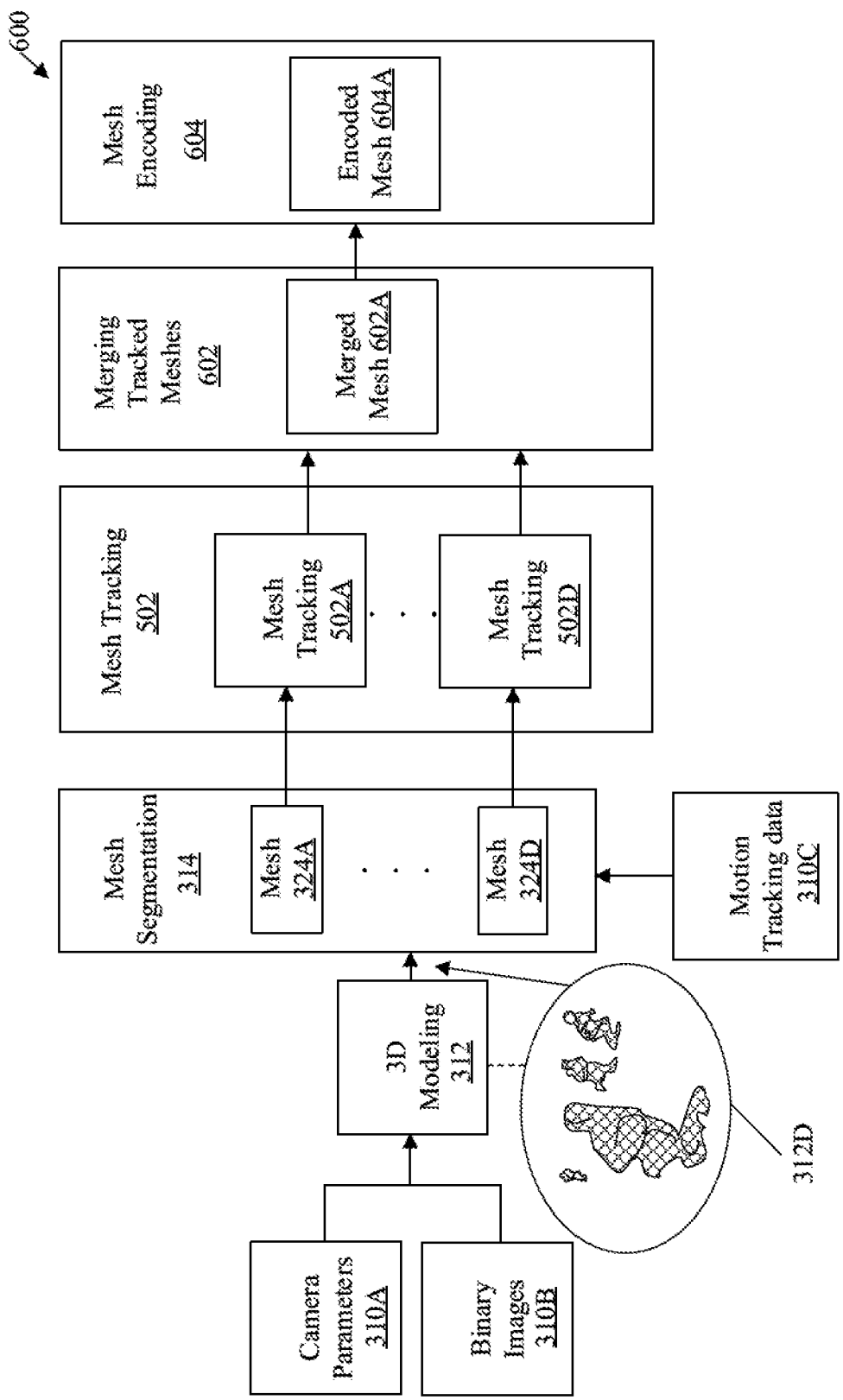
FIG. 6 illustrates a processing sequence for multiple mesh encoding that depicts distinct tracking operations of different 3D geometric meshes followed by merge operation before encoding operation, in accordance with an embodiment of the disclosure.

FIG. 6 illustrates an exemplary third processing pipeline for distinct tracking operations of different 3D geometric meshes and merge operation of the tracked 3D geometric meshes, in accordance with an embodiment of the disclosure. FIG. 6 is explained in conjunction with elements from FIG. 1, FIG. 2, FIGS. 3A and 3B, FIG. 4, and FIG. 5. With reference to FIG. 6, there is shown a processing sequence 600 for multiple-mesh encoding after segmentation of the 3D geometric mesh 312D. The operations 310, 312, and 314, such as data acquisition, 3D modeling, generation and segmentation of the 3D geometric mesh 312D has been described in details in the FIGS. 3A and 3B, and omitted here in FIG. 6 for the sake of brevity. The operation 502 that relates to mesh tracking has been described in detail in the FIG. 5, and omitted here in FIG. 6 for the sake of brevity.

After mesh tracking, at 602, the encoder 206 may be configured to merge the plurality of tracked 3D geometric meshes 502A to 502D into a single 3D geometric mesh (i.e. merged mesh 602A). The merged mesh 602A may be the second 3D geometric mesh. The encoder 206 may utilize the tracked vertices and the vertices connectivity of each of the plurality of tracked 3D geometric meshes 502A to 502D, to merge the plurality of tracked 3D geometric meshes 502A to 502D into the second 3D geometric mesh (i.e., the merged mesh 602A).

At 604, the encoder 206 may be further configured to encode the second 3D geometric mesh (i.e., the merged mesh 602A) to obtain an encoded or compressed second 3D geometric mesh (i.e., the coded mesh 604A). The operation for encoding the merged mesh 602A may be similar to the operation of encoding the plurality of 3D geometric meshes as described in detail, for example, in FIG. 4. Thus, the compressed 3D geometric mesh (i.e., the coded mesh 604A) of a second data size less than the first data size of the initially generated 3D geometric mesh (i.e., the first 3D geometric mesh) may be obtained. The coded mesh 604A may be packaged as 3D interactive video content, e.g., for free-view or multi-view applications, which may require less bandwidth and processing power for transmission to the one or more external devices, such as in live video broadcast or live broadcast of the sports event, in comparison to existing video or 3D geometric content broadcast.

In some embodiments, the processor 204 may be further configured to receive direction information of each of the plurality of objects 304 in the 3D space 302. The direction information may be received from the plurality of position trackers 308A to 308D. The direction information may include information of direction of movement of at least two of the first object 304A, the second object 304B, the third object 304C, and the fourth object 304D in the 3D space 302. The processor 204 may be further configured to determine one or more motion models of the associated with merged mesh 602A, based on the received direction information. The one or more motion models may be stored in at least one of the server 108, or the memory 208 of the apparatus 102.

For example, the first object 304A and the second object 304B may run in a first direction of the 3D space 302. The third object 304C and the fourth object 304D may run in a second direction of the 3D space 302. The one or more motion models may be determined based on the determination of the first direction and the second direction. The processor 204 may be further configured to divide the merged mesh 602A into a plurality of parts (3D meshes of players) based on the determined one or more motion models. The encoder 206 may be further configured to encode the plurality of parts of the merged 3D geometric mesh into a bitstream using known 3D object encoding techniques as described in detail, for example, in FIG. 4. Accordingly, compressed 3D geometric mesh may be obtained that may require lesser bandwidth and processing power for transmission to the one or more external devices.

Figure 7:
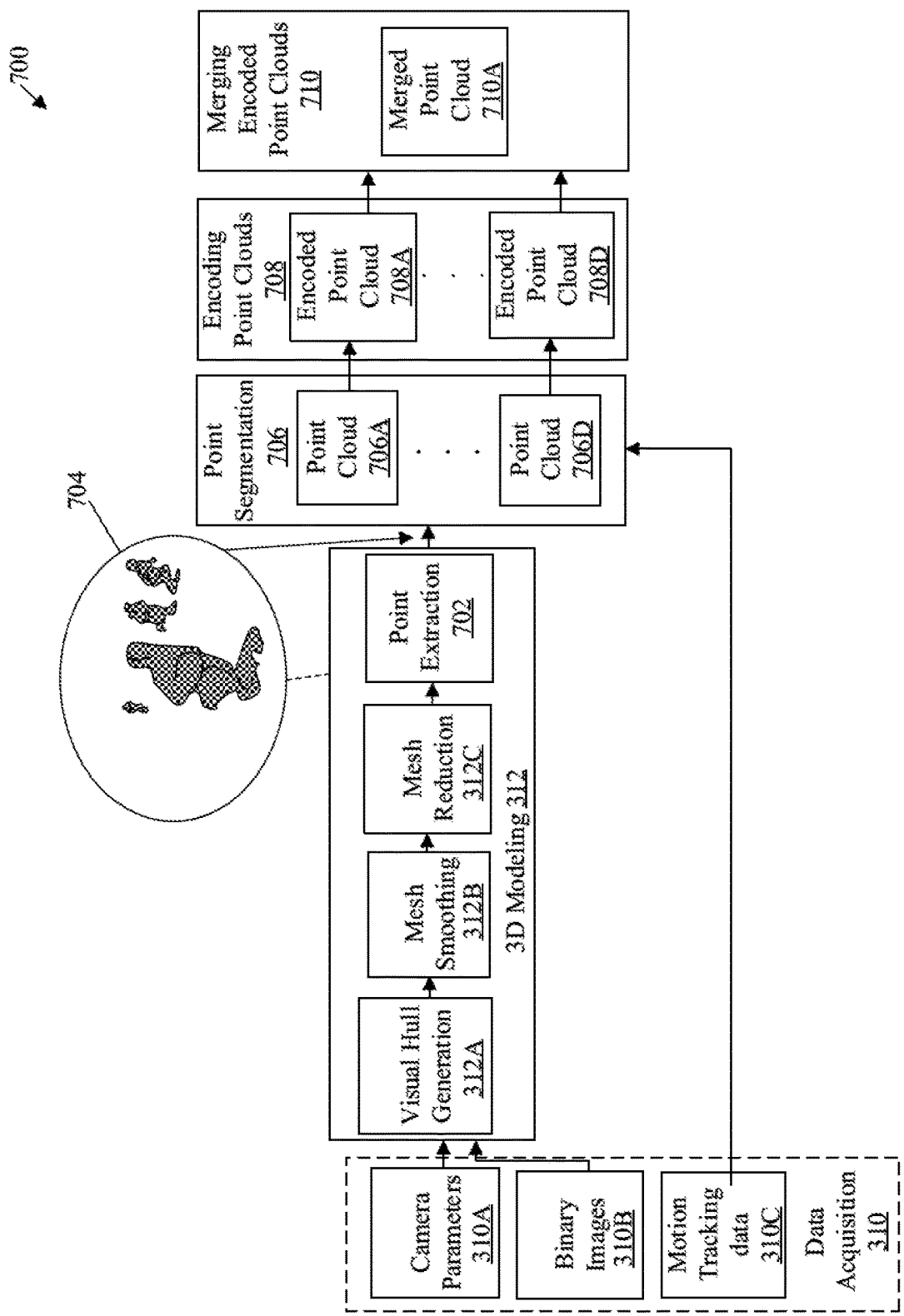
FIG. 7 illustrates an exemplary scenario for implementation of point cloud encoding using motion tracking data of objects, in accordance with an alternative embodiment of the disclosure.

FIG. 7 is an exemplary processing pipeline for generation, segmentation, and encoding of 3D point cloud, in accordance with an alternative embodiment of the disclosure. FIG. 7 is explained in conjunction with elements from FIG. 1, FIG. 2, FIGS. 3A and 3B, and FIG. 4. With reference to FIG. 7, there is shown a processing pipeline 700 to depict generation, segmentation, and encoding of a 3D point cloud. The operations 310, 312, and 314, such as data acquisition, 3D modeling 312, and generation of the 3D geometric mesh 312D has been described in details in the FIG. 3A, and omitted here in FIG. 7 for the sake of brevity.

At 702, the processor 204 may be configured to convert the 3D geometric mesh 312D into a point cloud 704. The processor 204 may extract points from the 3D geometric mesh 312D using mesh sampling techniques known in the art. The points may correspond to the vertices of the 3D geometric mesh 312D. In accordance with an embodiment, the processor 204 may be configured to sample surface of the 3D geometric mesh 312D by choosing a random triangle (from the triangular mesh as a triangle index) from the 3D geometric mesh 312D and then generate a point within the random triangle's bounds till a desired number of samples are obtained.

In some embodiments, the processor 204 may be configured to sample the 3D geometric mesh 312D by sampling volume of the 3D geometric mesh 312D. The processor 204 may voxelize the 3D geometric mesh 312D using conventional computer graphics techniques, such as, rastering. The processor 204 may further pick samples as random points within the voxels of the 3D geometric mesh 312D and repeat the process. Thus, the processor 204 may extract points from the 3D geometric mesh 312D to generate the point cloud 704 corresponding to the 3D geometric mesh 312D by using points within the voxels of the 3D geometric mesh 312D.

At 706, the processor 204 may be further configured to segment the generated point cloud 704 based on the motion tracking data 310C of each of the first object 304A, the second object 304B, the third object 304C, and the fourth object 304D. The processor 204 may segment the point cloud 704 into a plurality of point clouds 706A to 706N corresponding to each of the plurality of objects 304. The point cloud 704 may be segmented using 3D point cloud segmentation techniques, such as K-means clustering.

At 708, the encoder 206 may be further configured to distinctly encode each of the plurality of point clouds 706A to 706N using the motion tracking data 310C of each of the plurality of objects 304 in the 3D space 302. The encoder 206 may encode the points (such as the vertices) of each of the plurality of point clouds 706A to 706N and the point connectivity (as the vertices connectivity) between points of each of the plurality of point clouds 706A to 706D, based on the motion tracking data 310C as described above, for example, in FIG. 4. Thus, one or more encoded point clouds (i.e. coded point clouds 708A to 708D) corresponding to each of the plurality of point clouds 706A to 706D may be obtained.

At 710, the encoder 206 may be further configured to merge the, coded point cloud 708A to 708D, where each coded point cloud defines one object of the plurality of objects 304 into a single encoded point cloud (i.e. merged point cloud 710A), based on the motion tracking data 310C and the camera parameters 310A of each of the plurality of cameras 306A to 306D. Thus, a compressed point cloud (i.e., the merged point cloud 710A) of a second data size less than the first data size of the initially generated point cloud (i.e., the point cloud 704) may be obtained. The merged point cloud 710A may be packaged as 3D interactive video content, e.g., for free-view or multi-view applications, which may require less bandwidth and processing power for transmission to the one or more external devices, such as in live video broadcast or live broadcast of the sports event, in comparison to existing video or 3D geometric content broadcast.

FIGS. 8A, 8B, 8C, and 8D collectively, depicts a flowchart that illustrates exemplary operations of multiple mesh encoding using motion tracking data of objects, in accordance with an embodiment of the disclosure. With reference to FIGS. 8A, 8B, 8C, and 8D, there is shown a flowchart 800. The flowchart 800 is described in conjunction with FIGS. 1, 2, 3A, 3B, 4, 5, and 6. The operations 802 to 814 may be implemented in the apparatus 102. The operations in the flowchart 800 starts at 802.

At 802, binary images of plurality of objects 304, camera parameters of plurality of cameras 306A to 306D, and motion tracking data of plurality of objects 304 may be received. The processor 204 may be configured to receive the binary images of each of the plurality of objects and the camera parameters from the plurality of cameras 306A to 306D. The processor 204 may be further configured to receive the motion tracking data of each of the plurality of objects 304 from the plurality of position trackers 308A to 308D. The operation for reception of the binary images, the camera parameters, and the motion tracking information has been described in detail, for example, in FIG. 3A.

At 804, a 3D geometric mesh may be generated based on the binary images and the camera parameters. The processor 204 may be further configured to generate a 3D geometric mesh based on the binary images and the camera parameters. The operation for generation of the 3D geometric mesh has been described in detail, for example, in FIG. 3A.

At 806, the 3D geometric mesh may be segmented into a plurality of 3D geometric meshes based on the motion tracking data. The processor 204 may be configured to segment the 3D geometric mesh into a plurality of 3D geometric meshes based on the motion tracking data of each of the plurality of objects 304. Each of the plurality of 3D geometric meshes may correspond to each of the plurality of objects 304. The segmentation of the 3D geometric mesh into the plurality of 3D geometric meshes has been has been described in detail, for example, in FIGS. 3A and 3B.

In accordance with an embodiment, one mode of a plurality of modes may be set for processing of the segmented plurality of 3D geometric meshes. The plurality of modes may include a segment-merge-code (SMC) mode, a segment-track-code-merge (STCM) mode, and a segmenttrack-merge-code (STMC) mode. Alternatively, in accordance with an embodiment, a best mode of the plurality of modes may be determined for the processing of the segmented plurality of 3D geometric meshes. The best mode from the plurality of modes may be determined based on an estimation of a maximum amount of compression that may be achieved in shortest time among the plurality of modes. In cases where the SMC mode is selected, the control passes to 810A of FIG. 8B. In cases where the STCM mode is selected, the control passes to 812A of FIG. 8C and in cases where the STMC mode is selected, the control passes to 814A of FIG. 8D.

Figure 8A:
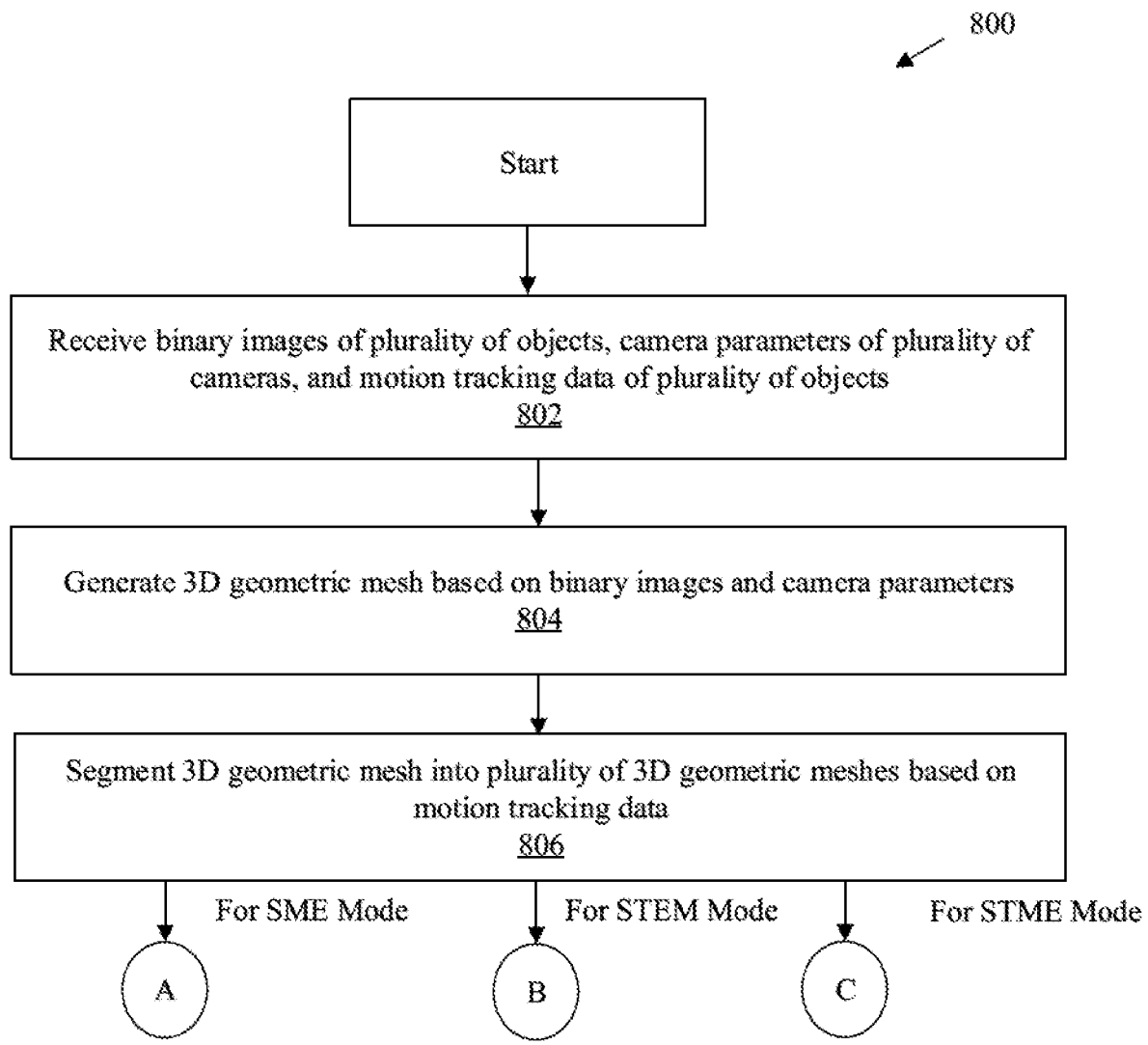
FIGS. 8A, 8B, 8C, and 8D, collectively, depicts a flowchart that illustrates exemplary operations to encode multiple meshes using motion tracking data of objects, in accordance with an embodiment of the disclosure.
Figure 8B:
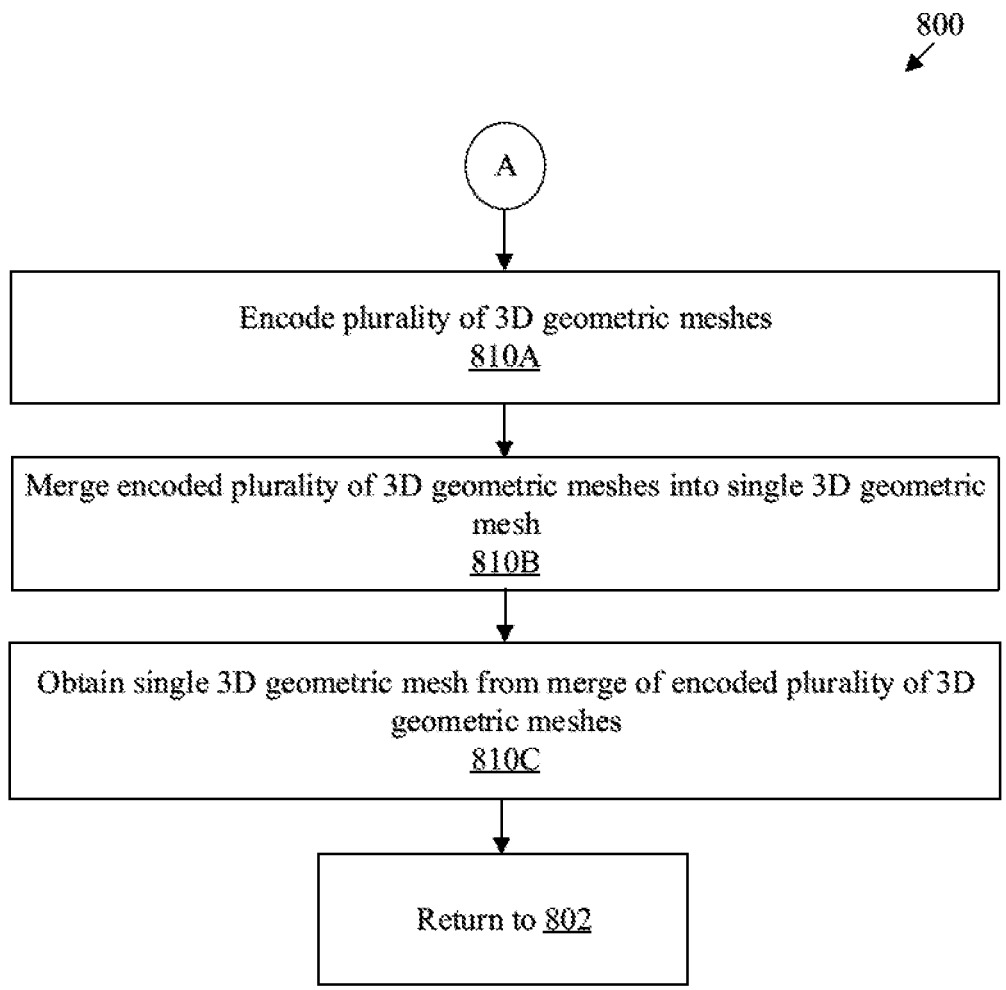

With reference to FIG. 8B, for the SMC mode, at 810A, the plurality of 3D geometric meshes may be first encoded. The encoder 206 may be configured to distinctly encode each of the plurality of 3D geometric meshes based on the segmentation of the 3D geometric mesh. An example of the encoding of the plurality of 3D geometric meshes has been has been described in detail, for example, in FIG. 4.

At 810B, the encoded plurality of 3D geometric meshes may be merged into a single 3D geometric mesh. The encoder 206 may be further configured to merge the encoded plurality of 3D geometric meshes into a single 3D geometric mesh. An example of the merging of the encoded plurality of 3D geometric meshes has been described in detail, for example, in FIG. 4.

At 810C, single 3D geometric mesh from the plurality of 3D geometric meshes may be obtained based on the merge of the encoded plurality of 3D geometric meshes. The encoder 206 may be configured to obtain the single 3D geometric mesh based on merge of the plurality of 3D geometric meshes into the single 3D geometric mesh as described in detail, for example, in FIGS. 4, 5, and 6. The control may return to 802.

Figure 8C:
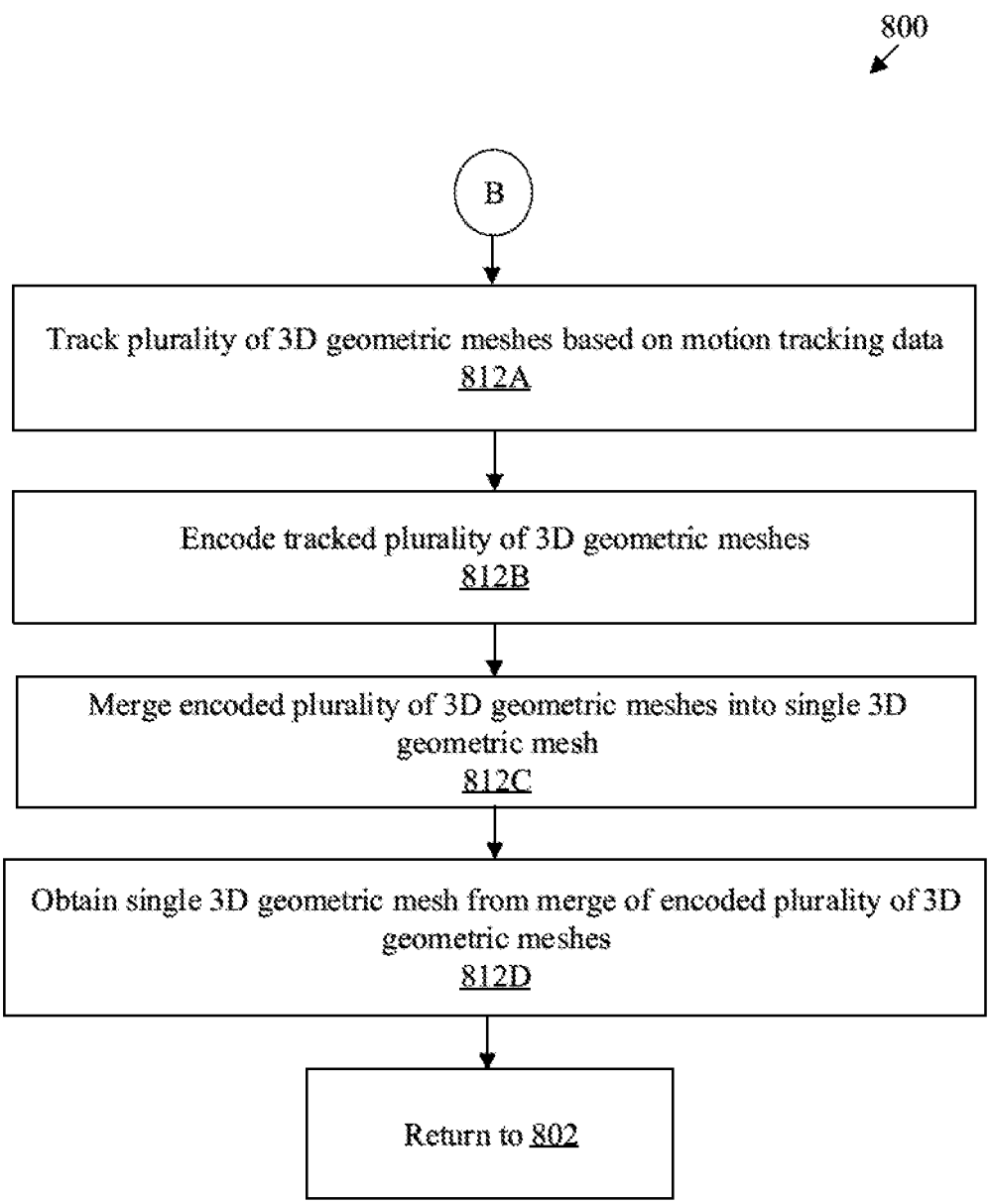

With reference to FIG. 8C, for the STCM mode, at 812A, the plurality of 3D geometric meshes may be tracked based on the motion tracking data. The encoder 206 may be further configured to distinctly track the plurality of 3D geometric meshes based on the motion tracking data of each of the plurality of objects 304. An example of the tracking the plurality of 3D geometric meshes has been described in detail, for example, in FIG. 5.

At 812B, the tracked plurality of 3D geometric meshes may be encoded. The encoder 206 may be further configured to encode the tracked plurality of 3D geometric meshes. The encoding the tracked plurality of 3D geometric meshes has been described in detail, for example, in FIG. 5.

At 812C, the encoded plurality of 3D geometric meshes may be merged into a single 3D geometric mesh. The encoder 206 may be configured to merge the encoded plurality of 3D geometric meshes into a single 3D geometric mesh, based on the motion tracking data and the camera parameters of each of the plurality of cameras 116A . . . 116D.

At 812D, single 3D geometric mesh from the plurality of 3D geometric meshes may be obtained based on the merge of the encoded plurality of 3D geometric meshes. The encoder 206 may be configured to obtain the single 3D geometric mesh based on merge of the plurality of 3D geometric meshes into the single 3D geometric mesh as described in detail, for example, in FIGS. 4, 5, and 6. The control may return to 802.

Figure 8D:
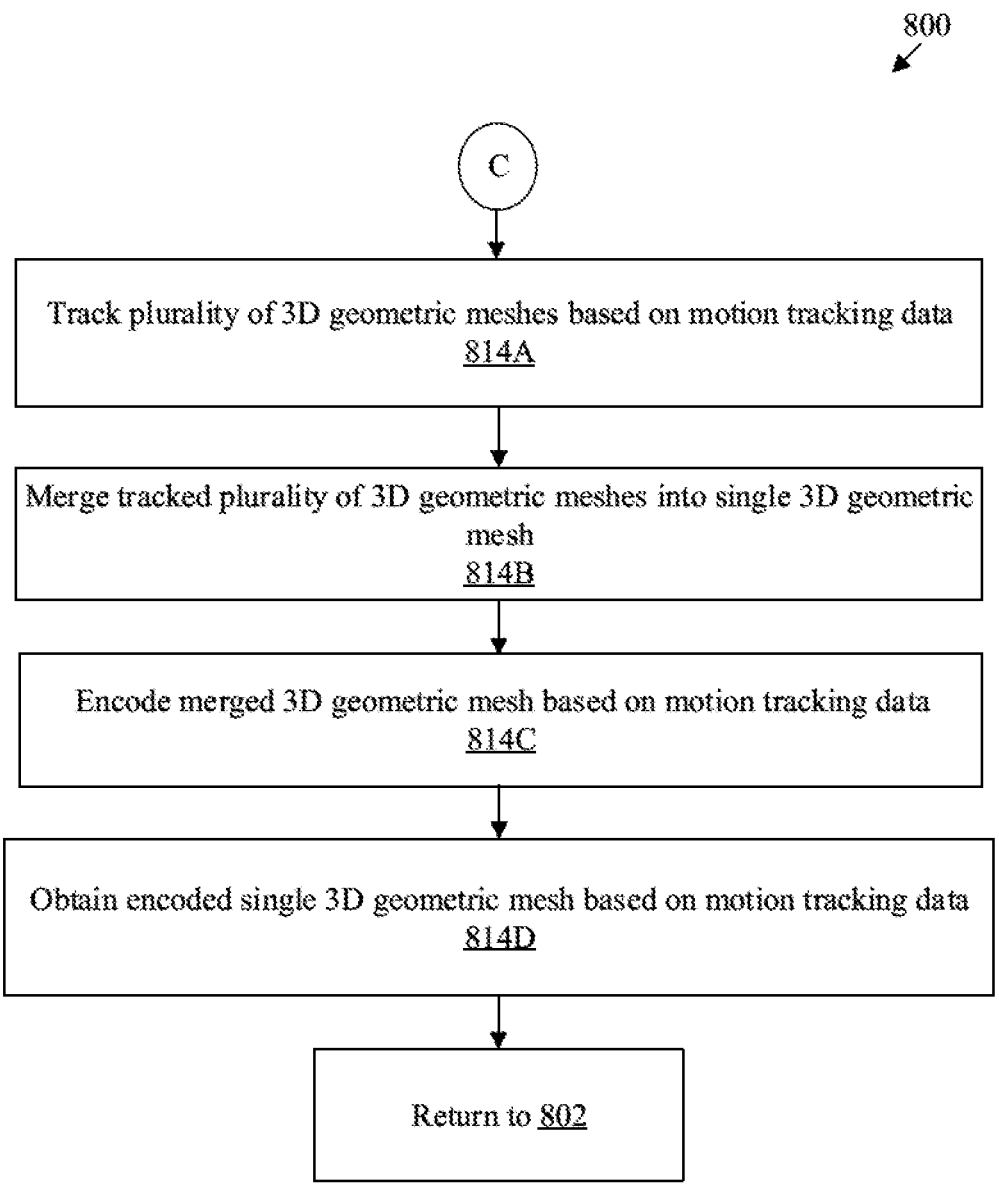

With reference to FIG. 8D, for the STMC mode, at 814A, the plurality of 3D geometric meshes may be tracked based on the motion tracking data. The encoder 206 may be further configured to track the plurality of 3D geometric meshes based on the motion tracking data of each of the plurality of objects 304. The tracking the plurality of 3D geometric meshes has been described in detail, for example, in FIG. 5.

At 814B, the tracked plurality of 3D geometric meshes may be merged into a single 3D geometric mesh. The encoder 206 may be further configured to merge the tracked plurality of 3D geometric meshes into a single 3D geometric mesh, based on the motion tracking data and the camera parameters of each of the plurality of cameras 106A, 106B, . . . , 106N.

At 814C, the merged 3D geometric mesh may be encoded based on the motion tracking data. The encoder 206 may be further configured to encode the merged 3D geometric mesh based on the motion tracking data of each of the plurality of objects 304. The encoding of the merged 3D geometric mesh has been described in detail, for example, in FIG. 6.

At 814D, the encoded single 3D geometric mesh from the plurality of 3D geometric meshes may be obtained based motion tracking data. The encoder 206 may be configured to obtain the encoded single 3D geometric mesh based on the motion tracking data as described in detail, for example, in FIGS. 4, 5, and 6. The control may return to 802.

In accordance with an embodiment of the disclosure, multiple mesh encoding using motion tracking data of objects is disclosed. The apparatus, such as the apparatus 102 (FIG. 1), may comprise a memory (such as the memory 208 (FIG. 2)) and circuitry (such as the circuitry 202 (FIG. 2)). The memory 208 may be configured to store a first 3D geometric mesh (such as the 3D geometric mesh 312D (FIG. 3A)) that may have a first data size. The first 3D geometric mesh may include a 3D representation of a plurality of objects (such as the plurality of objects 304 (FIG. 3A)) in a 3D space (such as the 3D space 302 (FIG. 3A)). The circuitry 202 may be further configured to receive motion tracking data (such as the motion tracking data 310C (FIG. 3A)) of each of the plurality of objects 304. The motion tracking data 310C may be associated with motion of each of the plurality of objects 304 from a first position to a second position in the 3D space 302. The circuitry 202 may be further configured to retrieve, from the memory 208, the first 3D geometric mesh. The circuitry 202 may be further configured to segment the first 3D geometric mesh into a plurality of 3D geometric meshes (such as the plurality of 3D geometric meshes 324A to 324D (FIG. 3B)), based on the received motion tracking data 310C of each of the plurality of objects 304. Each of the plurality of 3D geometric meshes 324A to 324D may correspond to each of the plurality of objects 304. The circuitry 202 may be further configured to encode the plurality of 3D geometric meshes 324A to 324D, based on the segmentation of the first 3D geometric mesh and the received motion tracking data 310C of each of the of the plurality of objects 304. A combination of the encoded plurality of 3D geometric meshes may have a second data size that may be less than the first data size.

The received motion tracking data 310C of each of the plurality of objects 304 may be acquired from a plurality of devices (such as the plurality of position trackers 308A to 308D (FIG. 3A)). Each of the device of the plurality of devices may be attached to each of the plurality of objects 304. The circuitry 202 may be further configured to identify each of the plurality of objects 304 in the 3D space 302, based on the received motion tracking data 310C. The circuitry 202 may be further configured to distinctly encode each of the plurality of 3D geometric meshes (such as the plurality of encoded meshes 402A to 402D (FIG. 4)) based on a 3D objects encoding technique. The circuitry 202 may be further configured to merge the encoded plurality of 3D geometric meshes into a second 3D geometric mesh (such as the merged mesh 404A (FIG. 4)) that may have the second data size, based on encoding information of each of the plurality of 3D geometric meshes 324A to 324D. The circuitry 202 may be further configured to transmit the second 3D geometric mesh as 3D interactive video content to an external device.

The circuitry 202 may be further configured to receive binary images (such as the binary images 310B (FIG. 3A)) of video that may include the plurality of objects 304 in the 3D space 302. The video may be captured from a plurality of cameras (such as the plurality of cameras 306A to 306D (FIG. 3)). The circuitry 202 may be further configured to receive camera parameters (such as the camera parameters 310A (FIG. 3A)) of the plurality of cameras 306A to 306D corresponding to the video. The circuitry 202 may be further configured to generate the first 3D geometric mesh that may have the first data size, based on the received binary images 310B and the received camera parameters 310A. The circuitry 202 may be further configured to store, in the memory 208, the generated first 3D geometric mesh. The camera parameters 310A may include at least one of a position of each of the plurality of cameras 306A to 306D in the 3D space 302, an angle of each of the plurality of cameras 306A to 306D, or device setting information of each of the plurality of cameras 306A to 306D.

The circuitry 202 may be further configured to track each of the plurality of 3D geometric meshes 324A to 324D based on the received motion tracking data 310C of each of the plurality of objects 304. The first 3D geometric mesh may be associated with video that may include the plurality of objects 304 in the 3D space 302. Each of the plurality of 3D geometric meshes 324A to 324D may be tracked for a specific number of frames of the video. The circuitry 202 may be further configured merge the tracked plurality of 3D geometric meshes (such as the plurality of tracked 3D geometric meshes 502A to 502D (FIG. 5)) into a second 3D geometric mesh (such as the merged mesh 602A (FIG. 6)). The circuitry 202 may be further configured to encode the second 3D geometric mesh after the merge, based on a 3D objects encoding technique, wherein the encoded second 3D geometric mesh (such as the encoded mesh 604A (FIG. 6)) may have the second data size.

The circuitry 202 may be further configured to distinctly encode each of the tracked plurality of 3D geometric meshes, based on information of the first position of each of the plurality of objects 304. An image frame that includes the information of the first position of each of the plurality of objects 304 may be used as a reference frame to encode each of the tracked plurality of 3D geometric meshes. The video data may correspond captured video of the plurality of objects 304 in the 3D space 302. The circuitry 202 may be further configured to merge the encoded plurality of 3D geometric meshes (such as the plurality of encoded 3D geometric meshes 504A to 504D)) into a second 3D geometric mesh (merged mesh 506A (FIG. 5)) that may have the second data size, based on the received motion tracking data 310C and encoding information of each of the plurality of 3D geometric meshes.

The circuitry 202 may be further configured to receive direction information of each of the plurality of objects 304 in the 3D space 302, from a plurality of devices (such as the plurality of position trackers 308A to 308D (FIG. 3A)). Each of the device of the plurality of devices 308A to 308D may be attached to each of the plurality of objects 304. The circuitry 202 may be further configured to determine one or more motion models associated with the second 3D geometric mesh (such as the merged mesh 602 (FIG. 6)), based on the received direction information and the received motion tracking data 310C. The one or more motion models may indicate one or more cumulative motion paths of one or more group of objects from the plurality of objects 304 in the 3D space 302. The circuitry 202 may be further configured to divide the second 3D geometric mesh into a plurality of 3D geometric portions, based on the determined one or more motion models. The circuitry 202 may be further configured to distinctly encode the plurality of 3D geometric portions of the second 3D geometric mesh, based on the determined one or more motion models.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform the steps that comprise storage of a 3D geometric mesh that may have a first data size. The first 3D geometric mesh may include a 3D representation of a plurality of objects in a 3D space. Motion tracking data of the plurality of objects may be received. The motion tracking data may include motion information of each of the plurality of objects in the 3D space. The motion information may associated with motion of each of the plurality of objects, from a first position to a second position, in the 3D space. The first 3D geometric mesh may be retrieved from the memory. The first 3D geometric mesh may be segmented into a plurality of 3D geometric meshes, based on the received motion tracking data of each of the plurality of objects. Each of the plurality of 3D geometric meshes may correspond to each of the plurality of objects. The plurality of 3D geometric meshes may be encoded, based on the segmentation of the first 3D geometric mesh and the received motion tracking data of each of the plurality of objects. A combination of the encoded plurality of 3D geometric meshes may have a second data size that may be less than the first data size.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An apparatus for three-dimensional (3D) geometric data compression, comprising:
    a memory configured to store a first 3D geometric mesh having a first data size, wherein
        the first 3D geometric mesh is associated with a video that includes a plurality of objects in a 3D space, and
        the first 3D geometric mesh includes a 3D representation of the plurality of objects in the 3D space; and
    circuitry configured to:
        receive motion tracking data of each of the plurality of objects, wherein
            the received motion tracking data indicates motion of each of the plurality of objects, from a first position to a second position, in the 3D space; retrieve, from the memory, the first 3D geometric mesh;
        compute a centroid of each of a plurality of faces of the first 3D geometric mesh based on an average of vertices of the first 3D geometric mesh;
        compute a first distance between adjacent faces of the plurality of faces based on the centroid of each of the plurality of faces;
        divide the first 3D geometric mesh into a plurality of vertical clusters based on the computed first distance between the adjacent faces, wherein the plurality of vertical clusters corresponds to the plurality of objects;
        segment the first 3D geometric mesh into a plurality of 3D geometric meshes, based on the plurality of vertical clusters and the received motion tracking data of each of the plurality of objects, wherein each 3D geometric mesh of the plurality of 3D geometric meshes corresponds to a respective object of the plurality of objects;
        compute a second distance between the centroid of each of the plurality of vertical clusters;
        compare the computed second distance with a threshold distance;
        segment adjacent faces of the plurality of 3D geometric meshes into a third geometric mesh based on a result of the comparison of the computed second distance with the threshold distance;
        identify a set of frames of the video based on the received motion tracking data of each of the plurality of objects; and
        encode the plurality of 3D geometric meshes based on
            a frame of the identified set of frames of the video,
            the segmentation of the first 3D geometric mesh, and
            the received motion tracking data of each of the plurality of objects,
        wherein a combination of the encoded plurality of 3D geometric meshes has a second data size that is less than the first data size.

2. The apparatus of claim 1, wherein
    the received motion tracking data of the plurality of objects is associated with a plurality of devices, and
    the plurality of devices is associated with the plurality of objects.

3. The apparatus of claim 1, wherein the circuitry is further configured to identify each of the plurality of objects in the 3D space based on the received motion tracking data.

4. The apparatus of claim 1, wherein the circuitry is further configured to:
    distinctly encode each of the plurality of 3D geometric meshes based on a 3D objects encoding technique; and
    merge the encoded plurality of 3D geometric meshes into a second 3D geometric mesh having the second data size, based on encoding information of each of the plurality of 3D geometric meshes.

5. The apparatus of claim 4, wherein the circuitry is further configured to transmit the second 3D geometric mesh as 3D interactive video content to an external device.

6. The apparatus of claim 1, wherein the circuitry is further configured to:
    receive binary images corresponding to the video, wherein the video is captured from a plurality of cameras;
    receive camera parameters of the plurality of cameras corresponding to the video;
    generate the first 3D geometric mesh having the first data size, based on the received binary images and the received camera parameters; and
    store, in the memory, the generated first 3D geometric mesh.

7. The apparatus of claim 6, wherein the camera parameters include at least one of a position of each of the plurality of cameras in the 3D space, an angle of each of the plurality of cameras, or device setting information of each of the plurality of cameras.

8. The apparatus of claim 1, wherein the circuitry is further configured to track each of the plurality of 3D geometric meshes based on the received motion tracking data of each of the plurality of objects.

9. The apparatus of claim 8, wherein each of the plurality of 3D geometric meshes is tracked for a number of frames of the video.

10. The apparatus of claim 8, wherein the circuitry is further configured to:
    merge the tracked plurality of 3D geometric meshes into a second 3D geometric mesh; and
    encode the second 3D geometric mesh after the merge, based on a 3D objects encoding technique, wherein the encoded second 3D geometric mesh exhibits the second data size.

11. The apparatus of claim 8, wherein the circuitry is further configured to:
    distinctly encode each of the tracked plurality of 3D geometric meshes, based on information of the first position of each of the plurality of objects, wherein
        an image frame that includes the information of the first position of each of the plurality of objects corresponds to a reference frame,
        each of the tracked plurality of 3D geometric meshes is encoded based on the reference frame, and
        the image frame is associated with the video that includes the plurality of objects in the 3D space; and
    merge the encoded plurality of 3D geometric meshes into a second 3D geometric mesh having the second data size, based on the received motion tracking data and encoding information of each of the plurality of 3D geometric meshes.

12. The apparatus of claim 11, wherein the circuitry is further configured to:
    receive direction information of each of the plurality of objects in the 3D space, from a plurality of devices, wherein each device of the plurality of devices is attached to each of the plurality of objects; and determine at least one motion model associated with the second 3D geometric mesh, based on the received direction information and the received motion tracking data, wherein the at least one motion model indicates at least one cumulative motion paths of at least one group of objects from the plurality of objects in the 3D space.

13. The apparatus of claim 12, wherein the circuitry is further configured to:
divide the second 3D geometric mesh into a plurality of 3D geometric portions, based on the determined at least one motion model; and
distinctly encode the plurality of 3D geometric portions of the second 3D geometric mesh, based on the determined at least one motion model.

14. A method for three-dimensional (3D) geometric data compression, comprising:
in an apparatus:
storing a first 3D geometric mesh having a first data size, wherein
the first 3D geometric mesh is associated with a video that includes a plurality of objects in a 3D space, and
the first 3D geometric mesh includes a 3D representation of the plurality of objects in the 3D space;
receiving motion tracking data of each of the plurality of objects, wherein
the received motion tracking data indicates motion of each of the plurality of objects, from a first position to a second position, in the 3D space;
retrieving the first 3D geometric mesh;
computing a centroid of each of a plurality of faces of the first 3D geometric mesh based on an average of vertices of the first 3D geometric mesh;
computing a first distance between adjacent faces of the plurality of faces based on the centroid of each of the plurality of faces;
dividing the first 3D geometric mesh into a plurality of vertical clusters based on the computed first distance between the adjacent faces, wherein the plurality of vertical clusters corresponds to the plurality of objects;
segmenting the first 3D geometric mesh into a plurality of 3D geometric meshes, based on the plurality of vertical clusters and the received motion tracking data of each of the plurality of objects, wherein each 3D geometric mesh of the plurality of 3D geometric meshes corresponds to a respective object of the plurality of objects;
computing a second distance between the centroid of each of the plurality of vertical clusters;
comparing the computed second distance with a threshold distance;
segmenting adjacent faces of the plurality of 3D geometric meshes into a third geometric mesh based on a result of the comparison of the computed second distance with the threshold distance;
identifying a set of frames of the video based on the received motion tracking data of each of the plurality of objects; and
encoding the plurality of 3D geometric meshes based on a frame of the identified set of frames of the video,
the segmentation of the first 3D geometric mesh, and
the received motion tracking data of each of the plurality of objects, wherein a combination of the encoded plurality of 3D geometric meshes has a second data size that is less than the first data size.

15. The method of claim 14, wherein
the received motion tracking data of the plurality of objects is associated with a plurality of devices, and
the plurality of devices is associated with the plurality of objects.

16. The method of claim 14, further comprising identifying each of the plurality of objects in the 3D space based on the received motion tracking data.

17. The method of claim 14, further comprising:
distinctly encoding each of the plurality of 3D geometric meshes based on a 3D objects encoding technique; and
merging the encoded plurality of 3D geometric meshes into a second 3D geometric mesh having the second data size, based on encoding information of each of the plurality of 3D geometric meshes.

18. The method of claim 17, further comprising transmitting the second 3D geometric mesh as 3D interactive video content to an external device.

19. The method of claim 14, further comprising:
receiving binary images of the video, wherein the video is captured from a plurality of cameras;
receiving camera parameters of the plurality of cameras corresponding to the video;
generating the first 3D geometric mesh having the first data size, based on the received binary images and the received camera parameters; and
storing the generated first 3D geometric mesh.

20. The method of claim 19, wherein the camera parameters include at least one of a position of each of the plurality of cameras in the 3D space, an angle of each of the plurality of cameras, or device setting information of each of the plurality of cameras.

* * * * *